United States Patent
Natarajan

(10) Patent No.: US 12,229,755 B2
(45) Date of Patent: *Feb. 18, 2025

(54) TIME-BOUNDED ACTIVITY CHAINS WITH MULTIPLE AUTHENTICATED AGENT PARTICIPATION BOUND BY DISTRIBUTED SINGLE-SOURCE-OF-TRUTH NETWORKS THAT CAN ENFORCE AUTOMATED VALUE TRANSFER

(71) Applicant: PROBLOCH LLC, Minneapolis, MN (US)

(72) Inventor: Ananth Natarajan, Minneapolis, MN (US)

(73) Assignee: Probloch LLC, Minneapolis, MN (US)

( * ) Notice: Subject to any disclaimer, the term of this patent is extended or adjusted under 35 U.S.C. 154(b) by 112 days.

This patent is subject to a terminal disclaimer.

(21) Appl. No.: 17/576,147

(22) Filed: Jan. 14, 2022

(65) Prior Publication Data
US 2022/0138730 A1 May 5, 2022

Related U.S. Application Data

(63) Continuation of application No. 16/105,138, filed on Aug. 20, 2018, now Pat. No. 11,227,282.

(51) Int. Cl.
*G06Q 20/38* (2012.01)
*G06Q 10/0631* (2023.01)
(Continued)

(52) U.S. Cl.
CPC ..... *G06Q 20/382* (2013.01); *G06Q 10/06313* (2013.01); *H04L 9/0643* (2013.01);
(Continued)

(58) Field of Classification Search
None
See application file for complete search history.

(56) References Cited

U.S. PATENT DOCUMENTS

| 5,893,074 A | 4/1999 | Hughes |
| 6,076,105 A | 6/2000 | Wolff |

(Continued)

FOREIGN PATENT DOCUMENTS

| CN | 108696514 A | * 10/2018 | ......... H04L 63/0428 |
| CN | 108921491 A | * 11/2018 | ........... G06Q 10/103 |

(Continued)

OTHER PUBLICATIONS

Wright et al., Sustainable blockchain-enabled services: Smart contracts. 2017 IEEE International Conference on Big Data. https://arxiv.org/abs/1806.10638 (Year: 2017).*

(Continued)

*Primary Examiner* — El Mehdi Oussir
(74) *Attorney, Agent, or Firm* — Sheppard Mullin Richter & Hampton LLP

(57) ABSTRACT

The disclosure relates to executing time bound activity chains using a baseline blockchain that encodes milestones and a realized blockchain that tracks activity relating to the milestones encoded on the baseline blockchain. Each project managed by the system may be scheduled using its own baseline blockchain, which stores time-bounded activity chains that encode milestones for that project. The realized blockchain stores performance related activity that validates and stores information indicating performance of actions related to milestones and automated transfer of value through the use of smart contracts. Each block of the realized blockchain not only references a prior block of the realized blockchain but also a corresponding baseline block, which encodes a milestone, in the baseline blockchain. Thus activity relating to progress toward a milestone may be recorded on a realized block, which refers back to a baseline block that specifies the milestone.

30 Claims, 13 Drawing Sheets

(51) Int. Cl.
  *H04L 9/06* (2006.01)
  *H04L 9/32* (2006.01)
  *H04L 9/40* (2022.01)
(52) U.S. Cl.
  CPC .......... *H04L 9/3247* (2013.01); *H04L 9/3263* (2013.01); *H04L 63/0823* (2013.01)

(56) References Cited

U.S. PATENT DOCUMENTS

| | | | |
|---|---|---|---|
| 6,308,164 | B1 | 10/2001 | Nummelin |
| 8,635,624 | B2 | 1/2014 | Subramanya |
| 9,934,138 | B1* | 4/2018 | Bache .................. G06F 11/3688 |
| 10,673,617 | B1 | 6/2020 | Antoniou |
| 11,157,876 | B1 | 10/2021 | Knas |
| 11,283,594 | B2* | 3/2022 | Viale ..................... H04L 63/123 |
| 11,283,814 | B2* | 3/2022 | Tatge ..................... G06F 21/602 |
| 11,381,972 | B2* | 7/2022 | Kvochko .............. H04W 12/08 |
| 11,463,238 | B2* | 10/2022 | Wilke ..................... G06F 21/64 |
| 2006/0070019 | A1 | 3/2006 | Vishnumurty |
| 2006/0259361 | A1 | 11/2006 | Barhydt |
| 2009/0125359 | A1 | 5/2009 | Knapic |
| 2010/0332278 | A1 | 12/2010 | Stern |
| 2013/0096971 | A1 | 4/2013 | Gupta |
| 2017/0031676 | A1 | 2/2017 | Cecchetti |
| 2017/0046689 | A1 | 2/2017 | Lohe |
| 2017/0048209 | A1 | 2/2017 | Lohe |
| 2017/0048234 | A1 | 2/2017 | Lohe |
| 2017/0048235 | A1 | 2/2017 | Lohe |
| 2017/0083907 | A1 | 3/2017 | McDonough |
| 2017/0085545 | A1 | 3/2017 | Lohe |
| 2017/0085555 | A1 | 3/2017 | Bisikalo |
| 2017/0091756 | A1 | 3/2017 | Stern |
| 2017/0103468 | A1* | 4/2017 | Orsini .................... G06Q 50/06 |
| 2017/0109735 | A1 | 4/2017 | Sheng |
| 2017/0140408 | A1* | 5/2017 | Wuehler ............. G06Q 30/0207 |
| 2017/0206522 | A1 | 7/2017 | Schiatti |
| 2017/0221052 | A1 | 8/2017 | Sheng |
| 2017/0232300 | A1 | 8/2017 | Tran |
| 2017/0279774 | A1* | 9/2017 | Booz .................. G06Q 20/0658 |
| 2017/0344987 | A1 | 11/2017 | Davis |
| 2017/0345011 | A1 | 11/2017 | Salami |
| 2017/0351729 | A1 | 12/2017 | Sarbaev |
| 2018/0039667 | A1 | 2/2018 | Pierce |
| 2018/0082291 | A1* | 3/2018 | Allen .................. H04L 63/0428 |
| 2018/0117446 | A1 | 5/2018 | Tran |
| 2018/0117447 | A1 | 5/2018 | Tran |
| 2018/0136633 | A1 | 5/2018 | Small |
| 2018/0158162 | A1* | 6/2018 | Ramasamy ............... H04L 9/14 |
| 2018/0176229 | A1* | 6/2018 | Bathen .................. H04L 9/3239 |
| 2018/0189732 | A1 | 7/2018 | Kozloski |
| 2018/0191503 | A1 | 7/2018 | Alwar |
| 2018/0248699 | A1 | 8/2018 | Andrade |
| 2018/0264347 | A1 | 9/2018 | Tran |
| 2018/0285840 | A1* | 10/2018 | Hasan .................... G06Q 50/01 |
| 2018/0293629 | A1* | 10/2018 | Roman ................. G06Q 10/101 |
| 2018/0343114 | A1* | 11/2018 | Ben-Ari .................. H04L 9/302 |
| 2019/0026669 | A1* | 1/2019 | Davis .................... G06F 16/182 |
| 2019/0044714 | A1 | 2/2019 | Parker |
| 2019/0054030 | A1 | 2/2019 | Hill |
| 2019/0057455 | A1* | 2/2019 | Mozeika ................ G06Q 40/12 |
| 2019/0082007 | A1 | 3/2019 | Klarman |
| 2019/0132350 | A1* | 5/2019 | Smith .................... G06F 21/577 |
| 2019/0188627 | A1 | 6/2019 | Hein |
| 2019/0229926 | A1 | 7/2019 | Handa |
| 2019/0236548 | A1* | 8/2019 | Singi .................. G06Q 20/3552 |
| 2019/0236726 | A1 | 8/2019 | Unagami |
| 2019/0289019 | A1 | 9/2019 | Thekadath |
| 2019/0295159 | A1 | 9/2019 | Samid |
| 2019/0303623 | A1* | 10/2019 | Reddy ..................... G06F 8/71 |
| 2019/0303807 | A1 | 10/2019 | Gueye |
| 2019/0318399 | A1 | 10/2019 | Davis |
| 2019/0340269 | A1* | 11/2019 | Biernat .................... H04L 9/50 |
| 2019/0340607 | A1 | 11/2019 | Lynn |
| 2019/0372755 | A1 | 12/2019 | Tadie |
| 2019/0392392 | A1* | 12/2019 | Elden .................... H04L 9/3239 |
| 2020/0007464 | A1 | 1/2020 | Lo |
| 2020/0021643 | A1 | 1/2020 | Purushothaman |
| 2020/0027096 | A1 | 1/2020 | Cooner |
| 2020/0034766 | A1 | 1/2020 | Borges |
| 2020/0127843 | A1 | 4/2020 | Webster |
| 2020/0328883 | A1 | 10/2020 | Kaizer |
| 2021/0012443 | A1 | 1/2021 | Davison |
| 2021/0035048 | A1 | 2/2021 | Adams |
| 2021/0073212 | A1 | 3/2021 | Conley |
| 2021/0075623 | A1 | 3/2021 | Petersen |
| 2021/0126797 | A1 | 4/2021 | Peng |
| 2021/0150541 | A1 | 5/2021 | Gurbuxani |
| 2021/0266167 | A1 | 8/2021 | Lohe |

FOREIGN PATENT DOCUMENTS

| | | | | |
|---|---|---|---|---|
| CN | 110720102 | A | * 1/2020 | ............ G06F 21/64 |
| CN | 110795755 | A | * 2/2020 | |
| CN | 110852723 | A | * 2/2020 | .......... G06Q 10/101 |
| CN | 108985758 | B | * 10/2020 | .......... G06Q 20/102 |
| CN | 113537947 | A | * 10/2021 | |
| CN | 114548910 | A | * 5/2022 | |
| EP | 3754589 | | 12/2020 | |
| EP | 3886398 | | 9/2021 | |
| JP | 2020085267 | | 4/2020 | |
| KR | 102191895 | | 12/2020 | |
| WO | 2018007916 | A1 | 1/2018 | |
| WO | WO-2018232036 | A1 | * 12/2018 | ............ G06F 16/27 |
| WO | 2020000349 | | 1/2020 | |
| WO | WO-2020000349 | A1 | * 1/2020 | |
| WO | 2020085266 | | 4/2020 | |
| WO | WO-2020122990 | A1 | * 6/2020 | ............ G01S 19/14 |
| WO | 2020141360 | | 7/2020 | |
| WO | 2020162573 | | 8/2020 | |
| WO | 2021099802 | | 5/2021 | |
| WO | 2021156321 | | 8/2021 | |
| WO | 2021215906 | | 10/2021 | |
| WO | WO-2022183366 | A1 | * 9/2022 | |
| WO | WO-2022240883 | A1 | * 11/2022 | .......... G06Q 10/103 |

OTHER PUBLICATIONS

Zhang et al. Deep Learning in Mobile and Wireless Networking: A Survey. IEEE Communications Surveys & Tutorials. https://arxiv.org/pdf/1803.04311 (Year: 2018).*

Wright et al. Sustainable blockchain-enabled services: Smart contracts. https://arxiv.org/abs/1806.10638 (Year: 2018).*

Medina, Edgar, "How is Blockchain Going to Change Project Management", printed from <URL: http://blog.workep.com/how-is-blockchain-going-to-change-project-management>, Feb. 21, 2018, 7 pages.

Milani, Fredrik, et al., "Blockchain and Principles of Business Process Re-Engineering for Process Innovation", Computer Science, Software Engineering, arXiv:1806.03054v1, Jun. 8, 2018 (Year: 2018), 15 pages.

Minnee, Marc, "Project Management Blockchain", printed from <URL: https://medium.com/@marc.minnee/project-management-blockchain-8f14abea49f8>, Dec. 18, 2016, 4 pages.

Santos, Jose Maria Delos, "Blockchain as a Project Management Platform", printed from <URL: https://project-management.com/blockchain-as-a-project-management-platform/>, Nov. 26, 2017, 6 pages.

Santos, Jose Maria Delos, "Will Project Management Shift Due to Blockchain Technology?", printed from <URL: https://project-management.com/will-project-management-shift-due-to-blockchain-technology/>, Nov. 27, 2017, 6 pages.

* cited by examiner

TIME-BOUNDED ACTIVITY CHAINS WITH MULTIPLE AUTHENTICATED AGENT PARTICIPATION BOUND BY DISTRIBUTED SINGLE-SOURCE-OF-TRUTH NETWORKS THAT CAN ENFORCE AUTOMATED VALUE TRANSFER

CROSS-REFERENCE TO RELATED APPLICATIONS

This application is a continuation of U.S. patent application Ser. No. 16/105,138, filed Aug. 20, 2018, entitled "TIME-BOUNDED ACTIVITY CHAINS WITH MULTIPLE AUTHENTICATED AGENT PARTICIPATION BOUND BY DISTRIBUTED SINGLE-SOURCE-OF-TRUTH NETWORKS THAT CAN ENFORCE AUTOMATED VALUE TRANSFER", which is hereby incorporated herein by reference in its entirety.

FIELD OF THE INVENTION

The field of the invention relates to using multiple blockchains and types of blockchains as a datastore for storing and tracking data relating to authenticated agent participation in time bounded linked activity chains with automated value transfer oriented to the realization of a goal or goals.

BACKGROUND OF THE INVENTION

Project networks are directed graphs that can represent a sequence of milestones to be completed for a project. Thus, a project network may be used to keep track of a progression of milestones. However, conventional project networks can be difficult to securely share in a network among participants such as project owners who obtain a benefit of project completion and value creators who work to achieve milestones. Conventional project networks may further lack security and automated execution of specified contracts at specific milestones. Conventional project networks may further lack immutability and provenance related to records of the executed contracts at those milestones. Blockchain, or more generally distributed ledger technology, promises to provide secure, immutable, and distributed data records that can be shared across users. However, despite these benefits, a conventional blockchain may be insufficient to model a project network due to the way decentralized ledgers are architected. For instance, conventional decentralized ledgers typically chain one block after another in which one block references the hash of an immediately preceding block. Conventional blockchain technology have other shortcomings. These and other problems exist with conventional project network and blockchain technologies.

SUMMARY

The disclosure addressing these and other problems relates to executing time bound activity chains using a baseline blockchain that encodes milestones and a realized blockchain that tracks activity relating to the milestones encoded on the baseline blockchain. Each project managed by the system may be scheduled using its own baseline blockchain and tracked using its own realized blockchain. The baseline blockchain for the project stores time-bounded activity chains that encode milestones for that project. In some instances, the baseline blockchain may store smart contracts that permit automated execution of previously agreed to conditions. For instance, each milestone block on the baseline blockchain may encode a smart contract, which encode one or more conditions for value creation, value transfer or value exchange. Agreement to the smart contract is denoted by the digital signatures of the project owner(s) and value creator(s) associated with that contract. Thus, the baseline blockchain may serve as immutable proof with provenance of the commitment to the project participants to the project milestones and corresponding baseline blockchain, in addition to its other functions. During project execution, transactions may be submitted for validation to this smart contract. The required signatures, the possible peers for endorsement and the consensus protocol may be defined in the smart contract, which approves submitted transactions. The validated transactions may be written to the realized blockchain. Thus, the realized blockchain for the project stores performance related activity that validates and stores information indicating performance of actions related to milestones and automated transfer of value through the use of the smart contracts, which may be encoded on the baseline blockchain. Unlike some conventional distributed ledger technologies, blocks of a first blockchain (e.g., the realized blockchain) may reference one or more prior blocks of the first (e.g., the realized blockchain), but also one or more corresponding blocks (e.g., baseline blocks), which encode one or more milestones, in a second blockchain (e.g., the baseline blockchain). Likewise, blocks on the baseline blockchain may refer back to one or more previous blocks in the baseline blockchain.

When a milestone is completed, agents relevant to the completion of the milestone, such as a project owner and/or a value creator may generate a transaction indicating performance of a milestone. The project owner(s), value creator(s), and/or others may digitally sign the transaction, which is then submitted to a blockchain network for validation. The corresponding smart contract for the milestone may be executed to ensure that the transaction is valid. For instance, the smart contract may specify that certain parties must digitally sign the transaction in order for it to be valid. If the specified parties have digitally signed the transaction, then the transaction is validated. The transaction result that is enforced by the smart contract may then written to the realized blockchain. Thus activity relating to progress toward a milestone and a user who is responsible to achieve the milestone may be recorded on a realized block, which refers back to a baseline block that specifies the milestone.

In this manner, the realized blockchain will be extended in accordance with achievement of the milestones encoded by the baseline blockchain. In some, but not necessarily all instances, this growth will be in a 1:1 correspondence in that the number of baseline blocks in the baseline blockchain will be equal to the number of realized blocks in the baseline blocks at project completion. Any change to a milestone in the baseline blockchain will not only need the signatures of the parties who are part of the embedded smart contract, it will also need the participation of all the succeeding milestones and associated parties up to the project end, thus requiring automatic notification and requiring participation from every party, milestone and activity affected by the change to the relevant block.

Token Types

Progress toward completion of the milestones may be tracked and rewarded with different types of tokens. For example, the system may use at least two types of tokens to independently track project value creation as milestones are reached and the monetary funds associated with milestone payments. A first type of token (also referred to throughout as "first token") may represent the monetary funds (e.g., fiat currency, digital currency, or other currency of value other than a second type of token) and a second type of token (also referred to throughout as "second token") may represent the project value creation. The second token (created project value) can be exchanged for the first token (monetary funds) at predefined milestones. Thus, completion of a milestone may or may not be associated with payment of the first token, but will be associated with accrual of the second token by a user that achieves a milestone, either of which may be in accordance with the appropriate smart contract. Put another way, there may be different types of milestones: one in which only the second token is awarded, one in which the second token may be awarded and the first token may also be awarded, and one in which the first and second tokens may be exchanged between the project owner and the value creator. The parties for the second type of milestone will be at least include the project value creator (a user who achieves the milestone), and the project promoter (a user who is a benefactor of achievement of the milestone, also referred to interchangeably as "project owner").

In this way, assets are not just exchanged but created and then exchanged for value as the realized blockchain grows (milestones achieved). As the created value accrues, the project moves closer to completion. Because the token rewards and exchanges are driven by the smart contracts, they may be reliably done so automatically without the need for bureaucratic intervention by a central authority.

Registering Users

Upon registration of a user, the system may assign or associate each user (such as a project owner or project value creator) with a digital wallet address, a public key and a private key. For example, the user may operate a node of the blockchain network. The user's node may generate the public and private keys. The public keys may be used to identify the user, to encrypt messages to the user, to verify the user's signatures, and together with the private keys may be used for public key cryptography. The private key is a secret private to the user in line with the principles of Public Key Cryptography. The user's node may operate a digital wallet that manages that user's keys. A Certificate Authority that may be associated with the system Public Key Infrastructure (PKI) may issue the user a certificate that identifies the user's public key, which may bind the user's identity to their public key. Unlike conventional certificates, user certificates may be updated with work value created by the user, which may span multiple projects. In this manner, the user certificates may identify a user as well as track activity in the form of work value created by that user over one or more projects. As such, a user certificate may be used to not only identify a user, but also store work records of the user across one or more projects, as well as, in some instances, to create projects.

In some implementations, the work record for a user may be available only to that user and accessible to other parties via permissioned access. For instance, a separate set of private and public keys may be generated for the user, which may be locally at the user's node. This separate set of private and public keys may be different than the ones used to digitally sign transactions and be identified for project purposes. The separate private key may be used to encrypt the work record such that the separate associated public key must be used to access the encrypted work record. As such, only entities that have been provided with the public key by the user can decrypt the certificate information that stores the user's identity and work record. A new public-private key pair to re-encrypt the certificate information after this public key has been shared may be generated, so that the new public key will be needed to view the certificate information for a subsequent share. This is because a leak of the public key sent earlier will make it possible for any party to decrypt the certificate. In some implementations, a certificate may not bind a user's identity and public keys. In these implementations, certificates maintained by the system will include only work records that are associated with the public key identity. As such, users may be able to control access to work records and identities. Choosing to do so fosters greater privacy and pseudonymity, but is detrimental to visibility of that users work record, and to their trustworthiness for third parties on the system. The foregoing implementation disclosing use of the public key to decrypt the certificate is the reverse of conventional public-private key cryptography in which the private key is usually used to decrypt content. In other implementations, the private key may be used to decrypt the certificate. In some implementations, the certificate may be stored locally at the user's node. It can then be managed by the digital wallet of the user's node. If a request is received for access to the identity and work record information in that certificate, the requestor will generate the key pair and share the public key with the user. The user encrypts the certificate using the received public key and passes on to the requestor who then can decrypt using the corresponding private key known only to the requestor. The hash of the certificate may be stored at the system for verification. In this implementation, it is not needed to re-encrypt the Certificate with new keys every time it is shared as with the other implementations described herein.

Project Creation and Registration

In an implementation, a project may be initiated by a user that possesses a certificate issued by a Certificate Authority that may be associated with the system Public Key Infrastructure (PKI). Certificates are obtained for the first time by contacting the System Public Key Infrastructure (PKI) with the public key and identity to be bound to it with some details pertaining to the identity, and proof for the identity that is being claimed by the owner of the public key. The user may obtain a project digital wallet address, a public key, and a private key for the project. These project specific keys may be distinct from the initiating user's own public and private keys. A user can thus initiate any number of projects identifiable on the system by their specific public keys. To register the project, the user may transmit the project's public key to the system, such as to a Certificate Authority ("CA") of the system. The CA may issue a certificate for the project that includes the project's public key. The project's wallet address may be used to store units of value. These units of value may represent, for example, a project's overall budget from which payments are provided to project value creators in exchange for achieving milestones, as codified in one or more smart contracts.

Upon project creation, the system may assign or associate a project with a wallet address, which may store the project's public and private keys. In some instances, the project is associated with a node in the blockchain network. The project node may be local to a computer system controlled by a user that is the initiator, owner or is otherwise responsible for project execution and results. In some instances, a user that controls the project node may also have another distinct identity (keys, wallet, etc.) as a project participant such as a project owner or value creator). The Certificate Authority associated with the system Public Key Infrastructure (PKI) may issue the project a certificate that identifies the project's public key and associates it with the project. The certificate may further identify users that are participating in the project, including users such project value creators and project owners. Thus, the project certificate may be used to permission access to the baseline and/or realized blockchains.

Adding Users to a Project by a Project Node

In some implementations, a node in the blockchain network may be operated on behalf of a project (this node will be referred to as a project node). This node may add users to the project. For example, if the user has not been registered with the system, the user will possess or will generate locally a digital wallet, a public key, and a private key and communicate their public key to the project node. The project node may register the user by transmitting the user's identity and public key to the CA on the system, which issues a certificate containing the user's public key. That user may then use the public key and private key for subsequent projects. In some instances, the user's digital wallet address and the private key may be generated by a user device associated with the user, which may be stored locally at the user device.

Milestone Updates Through Transaction Validation

Upon receipt of (including partial or full completion of) a milestone, a project owner or some other project participant that is party to the milestone, may generate a transaction for updating the realized blockchain to indicate that a milestone has been achieved. The transaction may include a payload that identifies a work record, a project, a milestone (such as a hash representing a baseline block that encodes the relevant milestone), and/or other information. The work record may specify actions that have been undertaken toward progressing to the milestone. The digital wallet may sign the transaction with the project owner's private key and transmit the transaction to the blockchain network for validation and incorporation into the realized blockchain. One or more nodes of the blockchain network may obtain and validate—in some instances by consensus decision—the submitted transaction. The validation may be based on whether the project owner is permitted to submit transactions to update the realized blockchain. For example, the nodes may consult the project certificate to identify valid users permitted to update a project's milestone by obtaining the public keys of users permitted to do so. For implementations where a consensus decision is used, the number, percentage, or other metric to determine whether a consensus has been achieved may be predefined or set according to particular needs. Furthermore, the consensus decision techniques may be based on consensus framework with methods or algorithms defined for that milestone, for example, Redundant Byzantine Fault Tolerance ("RBFT"), Apache Kafka, or Proof of Elapsed Time ("PoET"), and/or other consensus algorithm. Validation may be based on the verification of the presence of the signatures of the transaction participants whose signatures are required to validate the completion of the milestone transaction. The signatures may be signed with the private key known only to the signer. They are verified by using the associated public key that is the unique identifier of the signer on the project and the system. The parties that will sign the transaction may include the value creator, the project owner, and/or others. In some instances, only the project owner's signature is required. The milestone transaction may be submitted by any one or more of the parties. The endorsers may be identified in the smart contract definition by their public keys. If endorsers are defined for the milestone by the smart contract, it may also specify the consensus protocol for reaching agreement amongst them. The data that is signed can be, for instance, any document that signifies the attainment of that milestone, for instance the hash of a purchase order, or the hash of a receipt for some merchandise, containing the signatures of the beneficiary, performer, and/or others specified by the smart contract.

Alternatively or additionally, the validation may be based on whether the corresponding milestone's performance metrics are consistent with the work record. For example, the work record may specify that a certain action was achieved, which may be validated based on determining whether such action is specified by the relevant milestone. The specifications and performance metrics may be encoded in a smart contract associated with the corresponding milestone.

In some implementations, the transactions may be written to the realized blockchain whose correctness has been approved by the pre-defined endorsement and consensus framework or policy associated with the project network Updating Digital Wallets Upon making a decision that the transaction is valid, the one or more nodes may identify a reward to be provided to a project value creator. The reward may be encoded in a smart contract associated with the corresponding milestone. The smart contract may specify, for example, an amount of the second token to provide, which may be based on the work record and the milestone parameters. The smart contract may further specify whether the relevant milestone is associated with an ability to convert a value of the second token into a value of the first token. If the relevant milestone is the last milestone, the baseline and realized blockchains may be archived for the project. If not, a value of the second token may be accumulated for the project value creator. In this manner, the second token may be accumulated as the project value creator progresses toward different milestones for a project. The second tokens may be exchanged for first tokens at different points throughout the project when certain milestones are achieved, as encoded by the smart contracts. In some implementations, the project value creator's digital wallet (such as a balance of this digital wallet that stores a value of the first tokens for the project value creator) may be incremented with first tokens and a corresponding value may be deducted from the project's digital wallet (such as a balance of this digital wallet that stores a value of the first tokens for the project value creator). As previously noted, the smart contract may be stored in the corresponding milestone in the baseline blockchain. These smart contracts may be signed by the project participants and the project using their private key. The hash pointer(s) from succeeding milestones point to the smart contract. It therefore constitutes a binding contract, changes to which will require the signatures of the project participants specific to that contract, as well as the signatures of the participants in all subsequent milestones to restore the links in the baseline blockchain. The baseline blockchain therefore combines, binding, non-reputability and provenance to the project plan, rewards, etc.

In some implementations, there may be two types of milestones that affect the type of token that is provided responsive to a valid transaction indicating progress toward that milestone. The first type of milestone may be associated with providing only a second token to a project value creator. In this example, the project value creator's digital wallet will be incremented based on a value or number of the second token encoded by the smart contract for that milestone. In this sense, the value of the second token that is incremented is reflective of the project value that has been created.

The second type of milestone may be associated with providing a second token to a project value creator as well as permitting an exchange of the second token for a first token. In this example, the value of the project value creator's digital wallet will be decremented by an amount of the second token, and the value of the first token will be incremented. The project's digital wallet value or amount of the second token is incremented (indicating progress of the project) and the value or amount of the first token is decremented (to pay the project value creator for advancing the project/achieving a milestone).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The disclosure relates to executing projects and other time bound linked activity chains using a baseline blockchain that encodes milestones for a project and a realized blockchain that tracks activity relating to the milestones encoded on the baseline blockchain. A time bound activity chain may be represented by a blockchain that include a series of milestones for a project encoded as blocks on the blockchain. The time bound activity chain may be initially input as a project schedule may be created, built, and tracked as a time bound series of activities that are coded in distributed linked chains, entered as or part of transaction definitions or transactions in blockchains. Various stakeholders, from project owners, project value creators, regulatory agencies, and government authorities may use the system to immutably plan, create and track progress of projects.

Figure 1:
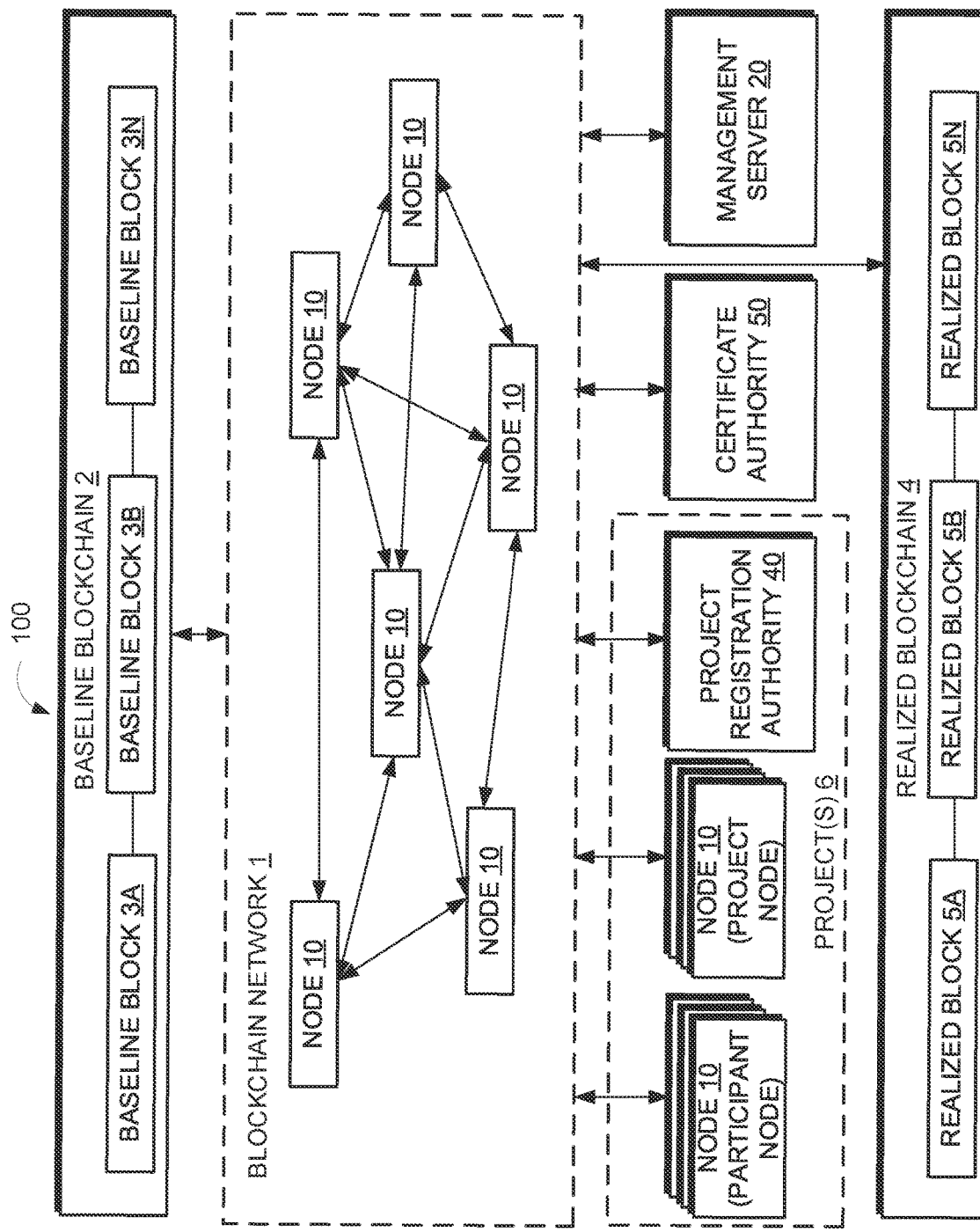
FIG. 1 illustrates an example of a system of executing time bound activity chains using a baseline blockchain that encodes milestones and a realized blockchain that tracks activity relating to the milestones encoded on the baseline blockchain, according to an implementation of the invention.

FIG. 1 illustrates an example of a system 100 of executing time bound activity chains using a baseline blockchain 2 that encodes milestones and a realized blockchain 4 that tracks activity relating to the milestones encoded on the baseline blockchain, according to an implementation of the invention.

System 100 may include a blockchain network 1 composed of nodes 10, a management server 20, one or more user devices 30, a Project Registration Authority ("PRA") 40, a Certificate Authority ("CA") 50, and/or other components. System 100 may manage multiple projects 6, one at a time or simultaneously. A project 6 refers to a series of activities to create value, bound by time constraints, and is generally temporary in nature. Each project 6 may be associated with its own set of nodes 10 and PRA 40 that are associated with the project. It should be noted that the blockchain network 1 may be composed at least partially of nodes 10 operated by a user (labeled in FIG. 1 as node 10 (participant node)—also referred to herein as a "participant node 10"). In some instances, the a project 6 may include a node 10 associated with the project itself (labeled in FIG. 1 as node 10 (project node)—also referred to herein as a "project node 10").

Baseline Blockchain

The baseline blockchain 2 may be formed from a series of baseline blocks 3 (illustrated as baseline blocks 3A-N) that refer back to a prior block in the baseline blockchain. For example, each block in the baseline blockchain 2 may include a header that includes a hash pointer to a preceding block. Each node 10 in the blockchain network 1 (or at least a majority of the nodes 10) stores a local copy of the baseline blockchain 2. Therefore, any change to a baseline block will require updating all subsequent baseline blocks at a majority of nodes 10, which is computationally improbable, making tampering with the baseline blocks in the baseline blockchain 2 difficult.

Each baseline block 3 may securely encode a milestone (e.g., tasks or events) to be achieved during project execution. The baseline block 3 may include or be associated with one or more milestone parameters that specify performance of the milestone, a smart contract for evaluating and rewarding performance of the milestone, and/or other information related to a milestone the baseline block 3 encodes. The milestone parameters may specify, for example, the timing (e.g., start, end, or other dates), scope (e.g., quantity and/or quality work completed), and cost (e.g., budget) associated with reaching the milestone in connection with execution of the project 6.

In some instances, the smart contracts may encode one or more conditions for value transfer or value exchange. Agreement to the smart contract is denoted by the digital signatures of the project owner(s) and value creator(s). Thus, the baseline blockchain 2 may serve as immutable proof with provenance of the commitment to the project participants to the project milestones and corresponding baseline blockchain, in addition to its other functions. During project execution, transactions may be submitted for validation to this smart contract. The required signatures, the possible peers for endorsement and the consensus protocol may be defined in the smart contract, which approves submitted transactions. The validated transactions may be written to the realized blockchain 4.

The smart contracts may be written in a Turing complete language, and may be compiled (to instructions executable on a processor or by a virtual machine, such as by compiling to byte code), and the resulting bytes are sent within a transaction to be written to the baseline blockchain 2. This transaction will require the signatures of the transaction parties that are named in the smart contract by their public keys. Thus, the smart contract may be deployed as code on the baseline blockchain 2.

A smart contract may identify the parties to a project 6 and encode one or more evaluation parameters that are used to assign a value to a level of achievement (including zero achievement) of the milestone. An evaluation parameter may include a base value, a bonus value, a penalty value, and/or other value that can be used assigned to a level of achievement of a milestone. For example, the base value may be assigned to a milestone if all the tasks in the milestone were achieved in accordance with the milestone parameters. Early achievement of or exceeding any one of the milestone parameters may result in a bonus value, while late achievement of or underperformance in any one of the milestone parameters may result in a penalty value.

The baseline blockchain 2 therefore stores the agreed-upon project, scope, and cost baselines as a chronological sequence of connected activities, capturing the relationship and flow of activities, with each activity on a node 10 encoded by a smart contract to be executed during project execution. The agreed upon smart contracts are signed by the relevant parties and are broadcast to all nodes 10, with the consensus protocol and the parties to the consensus defining whether a block containing each milestone will be written. The parties required in the consensus may not be limited to the parties associated with the associated transaction, but also parties affected by it. In some instances, smart contracts may be signed by the relevant parties and the project using their private keys. For a milestone encoded in a baseline block 3, consensus is implied by requiring the signatures of the relevant parties for that milestone. Because baseline blocks encoding milestones succeeding that milestone have hash pointers pointing to their predecessors, this also implies consensus from relevant parties on succeeding milestones. For the realized blockchain 4, the consensus protocol may be identified in the corresponding milestone on the baseline blockchain 2.)

Realized Blockchain

The realized blockchain 4 may be formed from a series of realized blocks 5 (illustrated as realized blocks 5A-N) that refer back to a prior block in the realized blockchain. For example, each realized block 5 in the realized blockchain 4 may include a header that includes a hash pointer to a preceding realized block. Each node 10 in the blockchain network 1 (or at least a majority of the nodes 10) stores a local copy of the realized blockchain 4. Therefore, any change to a realized block 5 will require updating all subsequent realized blocks at a majority of nodes 10, which is computationally improbable, making tampering with the realized blocks 5 in the realized blockchain 4 difficult.

Each realized block 5 may be associated with a corresponding baseline block 3. For instance, a realized block 5 may store a hash of a corresponding baseline block 3, which encodes a milestone and its associated data. As such, a realized block 5 may be associated with a corresponding milestone.

Each realized block 5 may also securely encode a level of achievement of the corresponding milestone. As such, while the baseline blockchain 2 stores milestones and related smart contracts for those milestones, the realized blockchain 4 may store levels of achievement of those milestones during execution of a project 6. As will be described below, when a milestone is reached, one or more nodes 10 may execute the smart contract and record the results, including any value changes, as a realized block in the realized blockchain 4.

First and Second Token Types

The system may use at least two types of tokens to independently track project value creation as milestones are reached and the monetary funds associated with milestone payments. For example, a first token may represent the monetary funds and a second token may represent the project value creation. The second token (created project value) can be exchanged for the first token (monetary funds) at predefined milestones. Thus, completion of a milestone may or may not be associated with payment of the first token, but will be associated with accrual of the second token by a user that achieves a milestone, either of which may be in accordance with the appropriate smart contract. Put another way, there may be two types of milestones: (1) one in which only the second token is awarded, and (2) one in which the second token may be awarded and the first token may also be awarded. The parties for the second type of milestone will be at least include the project value creator (a user who achieves the milestone), and the project owner (a user who is a benefactor of achievement of the milestone).

In this way, assets are not just exchanged but created and then exchanged for value as the realized blockchain 4 grows (milestones achieved). As the created value accrues, the project moves closer to completion. Because the token rewards and exchanges are driven by the smart contracts, they may be reliably done so automatically without the need for bureaucratic intervention by a central authority.

Figure 11:
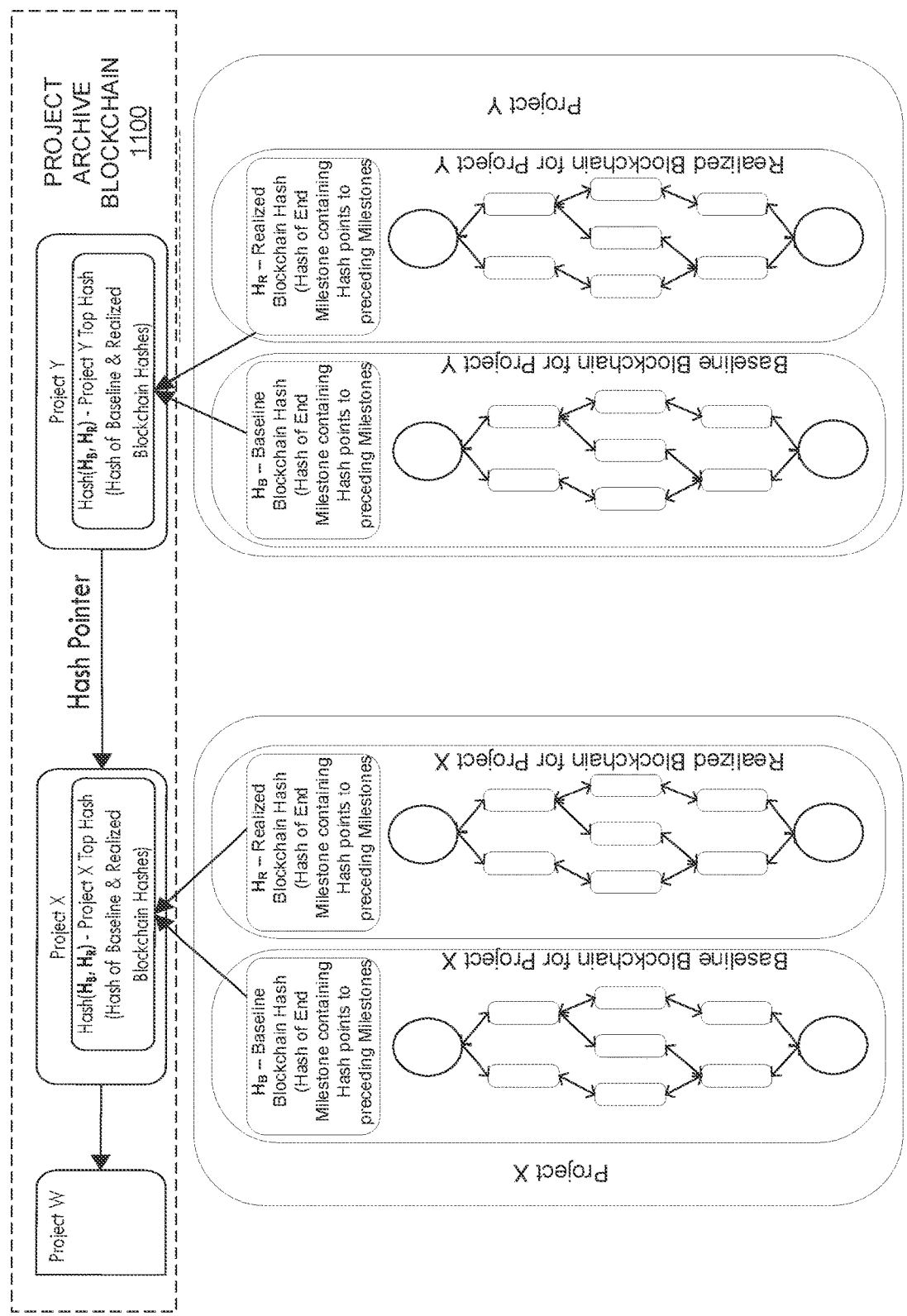
FIG. 11 illustrates an example of archiving the baseline blockchain and realized blockchain to a project archive blockchain upon project completion, according to an implementation of the invention.

Changes to the realized blockchain 4 are through transactions codified in smart contracts that belong to that project 6, at the project milestones. Transactions are instantiations based on the defined smart contracts. Milestone based payments are also automated this way. Completed blockchains 2 and 4 may be archived, an example of which is illustrated in FIG. 11. The record of value creation and the users identified by the certificates and bound to public keys may be maintained. In some instances, the blockchains may be archived as follows. The hash of the ending blockchain block 3 (also referred to as a last baseline block hash) of the baseline blockchain 2 and the hash of the ending blockchain block 5 (also referred to as a last realized block hash) of the realized blockchain 4 may be hashed for the top hash of the project 6 to which the blockchains 2 and 4 relate. The resultant top hash (a hash of the last realized block hash and the last baseline block hash) may be appended to a separate archive blockchain (not illustrated) by using it as a hash pointer. Therefore, every project completed on the system may be archived using the separate archive blockchain.

The realized blockchain 4 may be depicted as a state machine that is in a stable state at any given time and transitions into the next stable state when pre-defined transaction(s) are automatically validated from pre-defined conditions being met and these validated transaction(s) are approved by the identified network of peer nodes.

The realized blockchain 4 may constitute a growing transaction-based state machine, where the laws governing growth are written into the baseline blockchain 2, and interpreted by smart contracts (in some instances, at least some of these laws may be encoded in the smart contracts themselves) to create transactions contingent on approval by the defined peers and the defined consensus method. Blockchains 2 and 4 belonging to a project inherently have a transitory phase where a change to their state can take place including growth and mutation, due to the temporary nature of project undertakings.

The data stored in the baseline blockchain 2 and the realized distributed ledger 4 may be secured using cryptographic keys. For example, each user may be assigned with a public key and a private key as previously noted. The blockchain wallet 317 may use the private key for digitally signing data and/or decrypting data encrypted for access only by the user using the user's public key. Each project 6 may be assigned a cryptographic certificate as well.

Public Key Infrastructure ("PKI")

A user may be assigned with a public key, which can be used to uniquely identify the user, and a private key, which is known only to the user and is used to securely digitally sign data. Conventional encryption keys may be used for the public and private keys described herein.

Verified key bindings will form an infrastructure of users with verified work records. PKI data may be generated from projects (e.g., at a project node 10) but may be available on the system to all projects 6. Updates to PKI at the system level from records pertaining to a particular project is after completion of that particular project. A project's PKI may be determined based on:

Signing of public keys by designated members of a project network, typically the project owner or project (these functions may be combined into one entity). This designated member is called the PRA 40 and can be associated with a node specific to the project.

CA 50 or PRA 40 may verify the user credentials at the beginning of the first project contribution by that user. User credentials that are forwarded to them can be verified by other pre-verified project parties for their first project.

Record of signatures associated with a public key

Record of projects and project value created against a public key (in other words, value created by a user assigned with the public key).

A first type of user public key certificate may include the details of the user's identity and also a record of work and will be updated upon completion of projects where project value creator associated with the public key has added value.

Figure 12:
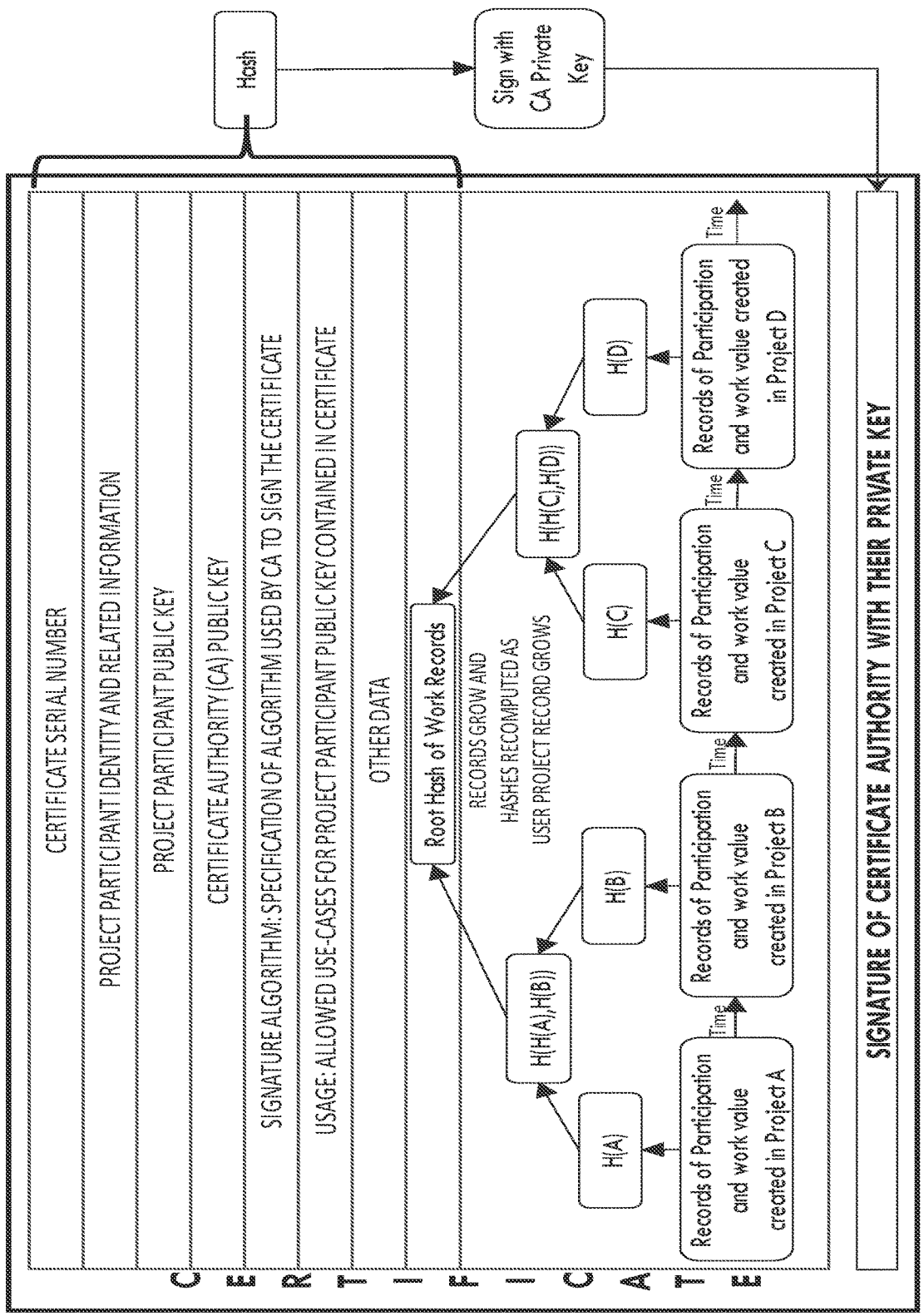
FIG. 12 illustrates an example of a first type of user Certificate, according to an implementation of the invention.

The record of work in the certificate may be maintained in realized blockchain 4, or any other data structure. An example of a first type of user public key certificate is illustrated in FIG. 12. Each public key certificate may be characterized by:

CA 50 or PRA 40 verification and signature.

Concurrently, signature of any other verified project user of a user's credentials may be included.

Details of the user's identity.

Record of projects and project value created against the user's public key.

Figure 13:
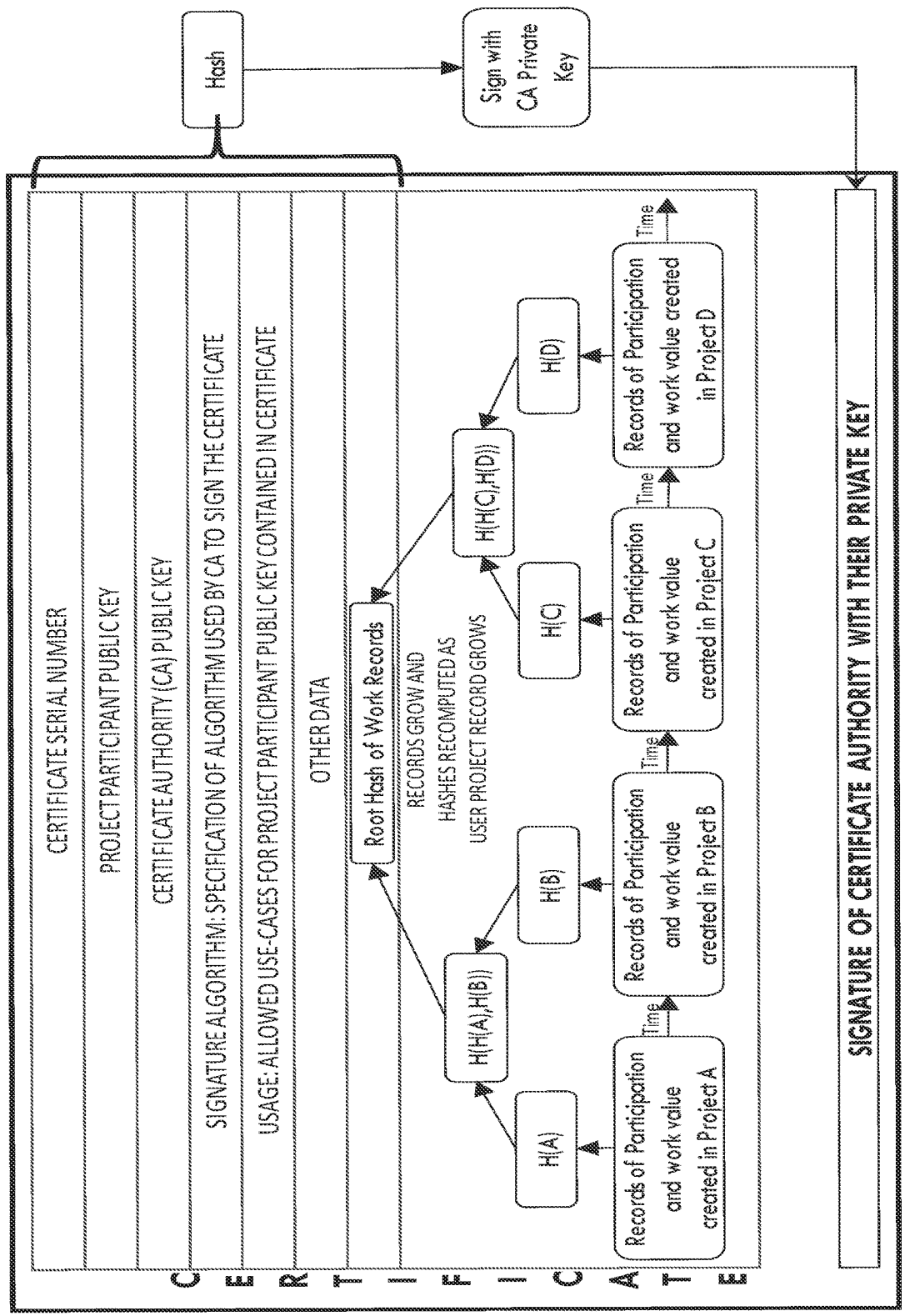
FIG. 13 illustrates an example of a second type of user Certificate, according to an implementation of the invention.

In some implementations, a second type of user public key certificate may be formed in the same manner as the first type of public key certificate, but omit the details of the user's identity in the interest of privacy with the concomitant effect on trust related to that entity and may also differ from the above by being issued only by the PRA 40 (not the CA 50). An example of a first type of user public key certificate is illustrated in FIG. 13.

Figure 14:
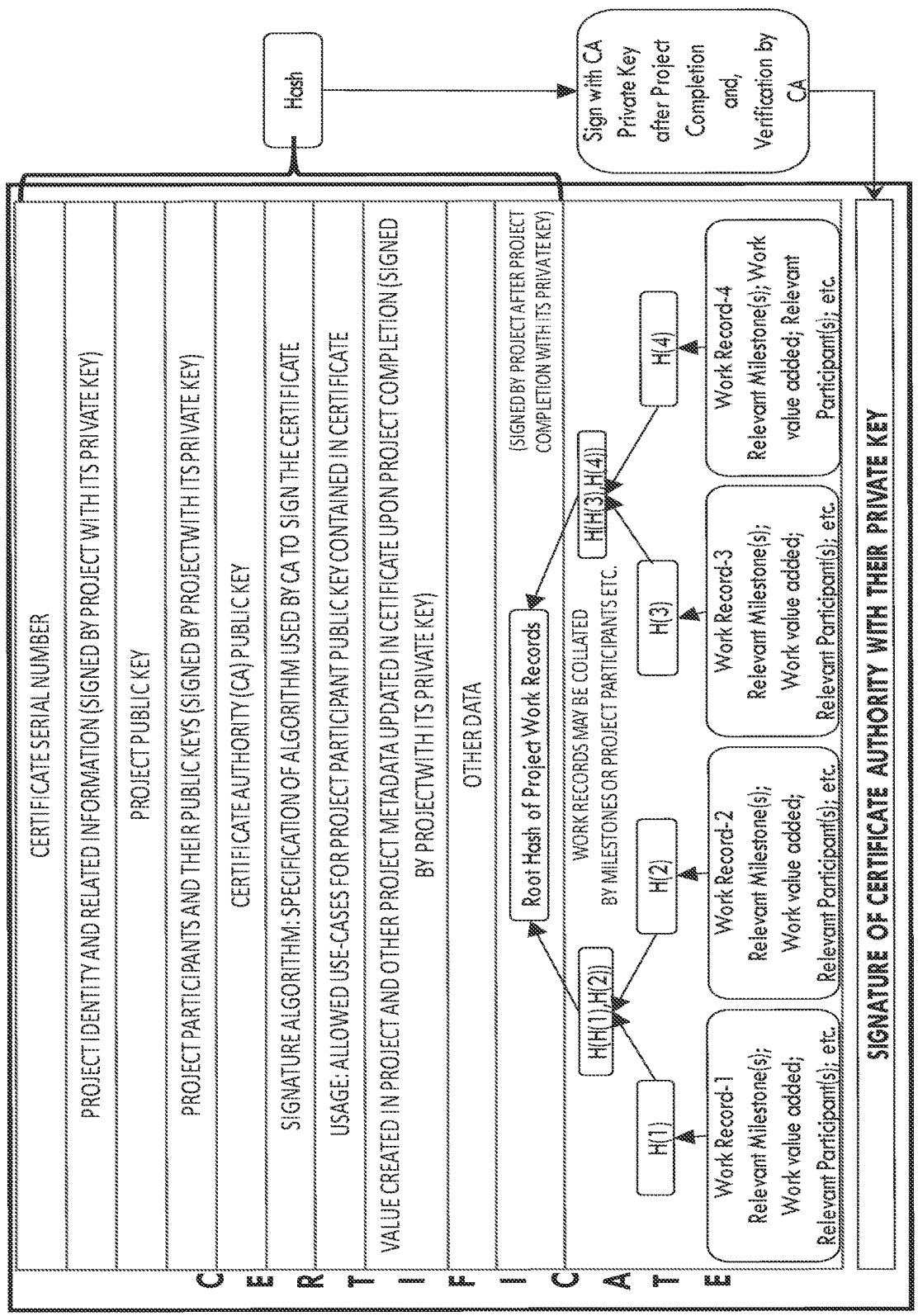
FIG. 14 illustrates an example of a Project Certificate, according to an implementation of the invention.

A third type of certificate, an example of which is illustrated in FIG. 14, may be associated with the project and is characterized by:

CA 50 verification and signature.

Includes details of the project's identity.

Record of project value created against the project's public key.

Project owner's Public Key or Keys if applicable

Identify users in the project based on their public keys.

Value created against each user's public key.

This type of certificate may be obtained directly from the CA

In some implementations, work records are authenticated and stored in the user certificates. As such, the PKI on the system may store work records, identity information, and/or other information against a public key from all projects. In some instances, a given user's certificate may store work records of the user across all projects. In some implementations, a Project PKI may inherit the certificate for a user from the system PKI, store this at the project node 10, and update work information with value created at milestones at the realized blockchain 4. Upon completion of the project, the work performed (in terms of value created) may be summarized and sent to the system to update the certificate for that user on the system PKI.

In some implementations, another unique facet to this PKI for a project is the storage of work records in the same certificate that has the binding to a user. The work records are measured in the form of value tokens created upon reaching specifically encoded milestones (via smart contracts) based upon the encoded requirements. The association of the created value with the user that creates value and the project in which it was created is remembered and incorporated in the certificate for that value creator. All these entities are identified by their associated Public Keys. A certificate associating a project 6 with its public key is also maintained by the system.

Figure 2:
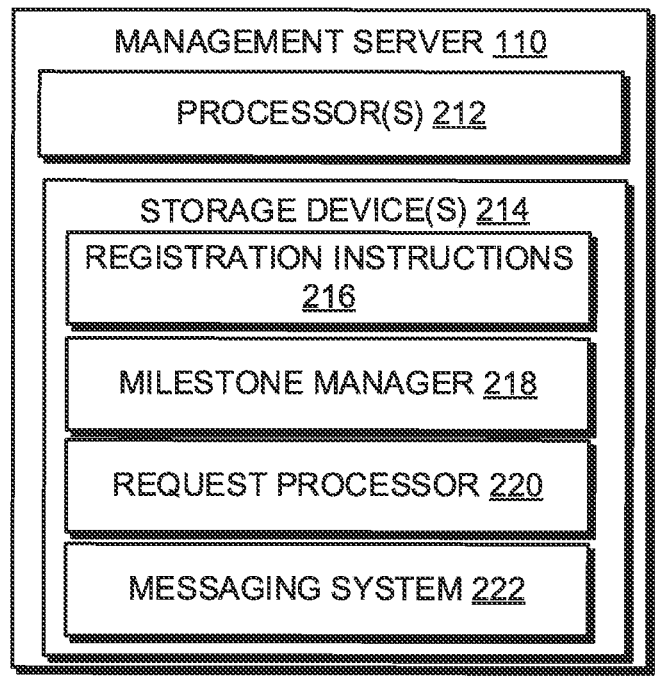
FIG. 2 illustrates an example of a management server in a system for executing time bound activity chains using a baseline blockchain and a realized blockchain, according to an implementation of the invention.

Reference will be made to FIG. 2, which illustrates an example of a management server 20 in a system for executing time bound activity chains using a baseline blockchain and a realized blockchain, according to an implementation of the invention. The management server 20 may include one or more processors 212, one or more storage devices 214, and/or other components. The storage devices 214 may store one or more instructions that program the processors 212 to perform the functions described herein. The one or more instructions may include, without limitation, registration instructions 216, a project engine 218, and/or other instructions.

The registration instructions 216 may register users to use the system. The registration instructions 216 may cause the PRA 40 and/or the CA 50 to verify and issue certificates associating public and private keys with a user. In some instances, as previously noted, a participant node 10 may issue the public and private keys for the user. In these instances, registering a user may include communicating the public key associated with the digital wallet 137 of the user, and possibly identity information pertaining to the user, to the project's PRA 40 which may be located at the project node 10, and by the project node 10 to the system CA 50 with the request for a certificate containing the public key. The PRA 40 and/or the CA 50 may issue the certificate. The PRA 40 will be at the Project Node 10 that will possess a Certificate issued by CA 50 as previously and subsequently noted, creating a web of trust. Upon registration, a user device 30 may be provided with a public key and a private key, which may be stored via a wallet 32. The user may use the wallet 32 to interact with and provide transactions for the realized distributed ledger 4, as described herein. As such, the user may use the wallet 32 to provide work records for transaction validation, receive second tokens for project value creation defined by the smart contracts, and exchange the second tokens for the first tokens, which may also be defined by the smart contracts.

The registration instructions 216 may register projects. For instance, a project owner may initialize a project to be created. The project 6 may be provided with public and private keys in a manner similar to a user being provided with public and private keys, as well as corresponding certificate.

Figure 4:
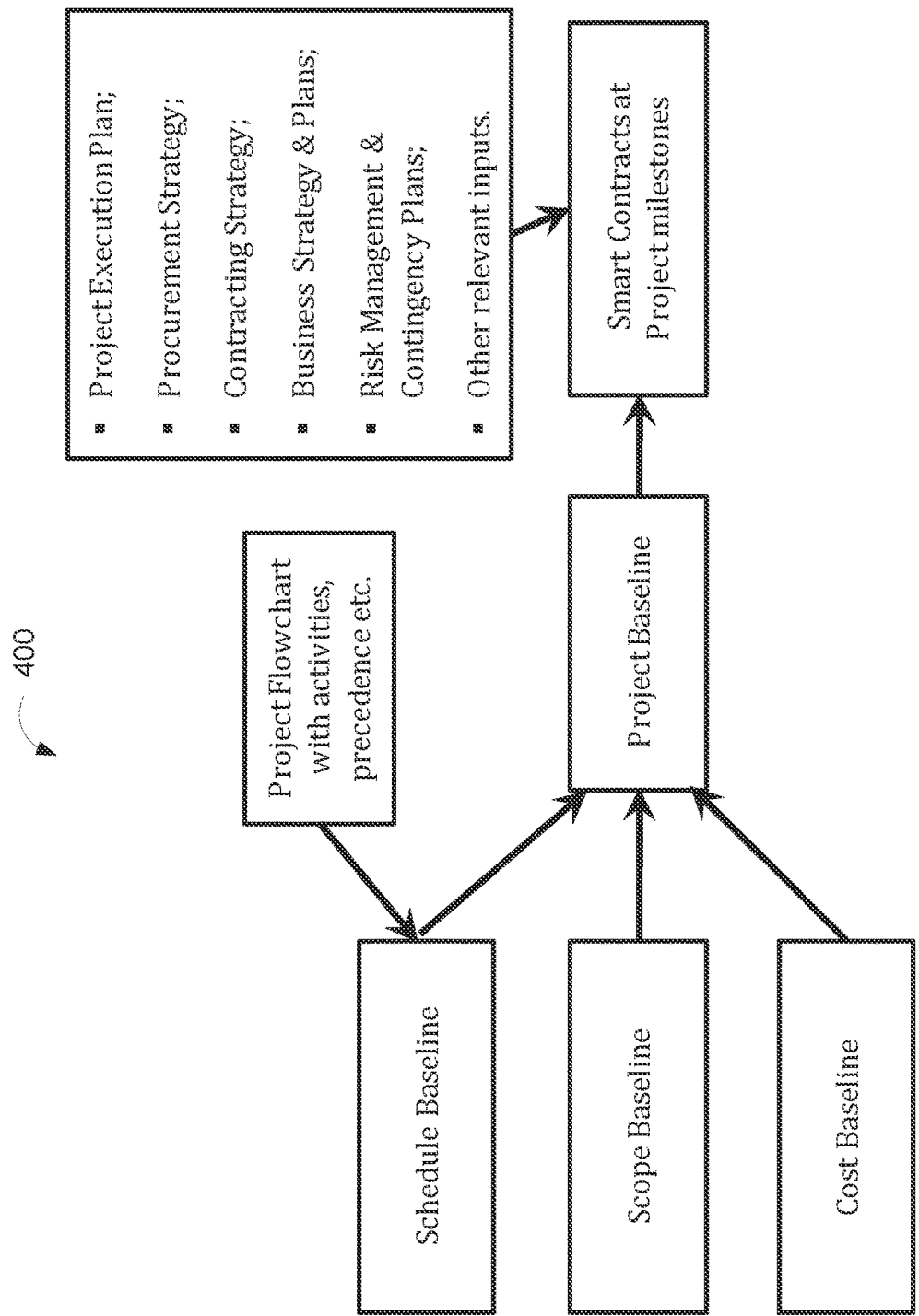
FIG. 4 represents a schematic representation of generating a project, according to an implementation of the invention.

Inputs for the baseline blockchain 2 may be generated during a project planning stage to code the activities and project execution. For example, the project engine 218 may initialize a project 6. For example, the project engine 218 may receive as input, milestones (e.g., milestone parameters), smart contracts, identification of users, and/or other parameters used to set up a project 6. The milestones may be received in the form of a project flowchart that specifies a flow from one milestone to the next, until a final milestone achieved. It should be noted that milestones may be concurrent in that progress toward multiple milestones may be concurrently performed and achieved in order to progress to a next milestone. FIG. 4 represents a schematic representation 400 of generating a project 6. A Project Flowchart (such as a GANTT or other flowchart) may be used to generate a Schedule Baseline. The Schedule Baseline along with a Scope Baseline and Cost Baseline (e.g., milestone parameters) may be used to generate a Project Baseline. A Project Execution Plan, Procurement Strategy, Contracting Strategy, Business Strategy and Plans, Risk Management and Contingency Plans, and/or other inputs may be agreed to by the parties and encoded as Smart Contracts at various Project milestones. In some implementations, smart contract definitions may be inherited from prototypes and other projects 6 stored on the via permissioned access. In this manner, terms of smart contracts may be used from one project to a current project. The Project Baseline may be encoded into a baseline blockchain 2. For example, the project engine 218 may write the milestones as a baseline block 3 into the baseline blockchain 2. The project engine 218 may then share the baseline blockchain 2 to the blockchain network 1, which may be composed of only nodes 10 operated by project users or nodes 10 operated by any party.

Figure 5:
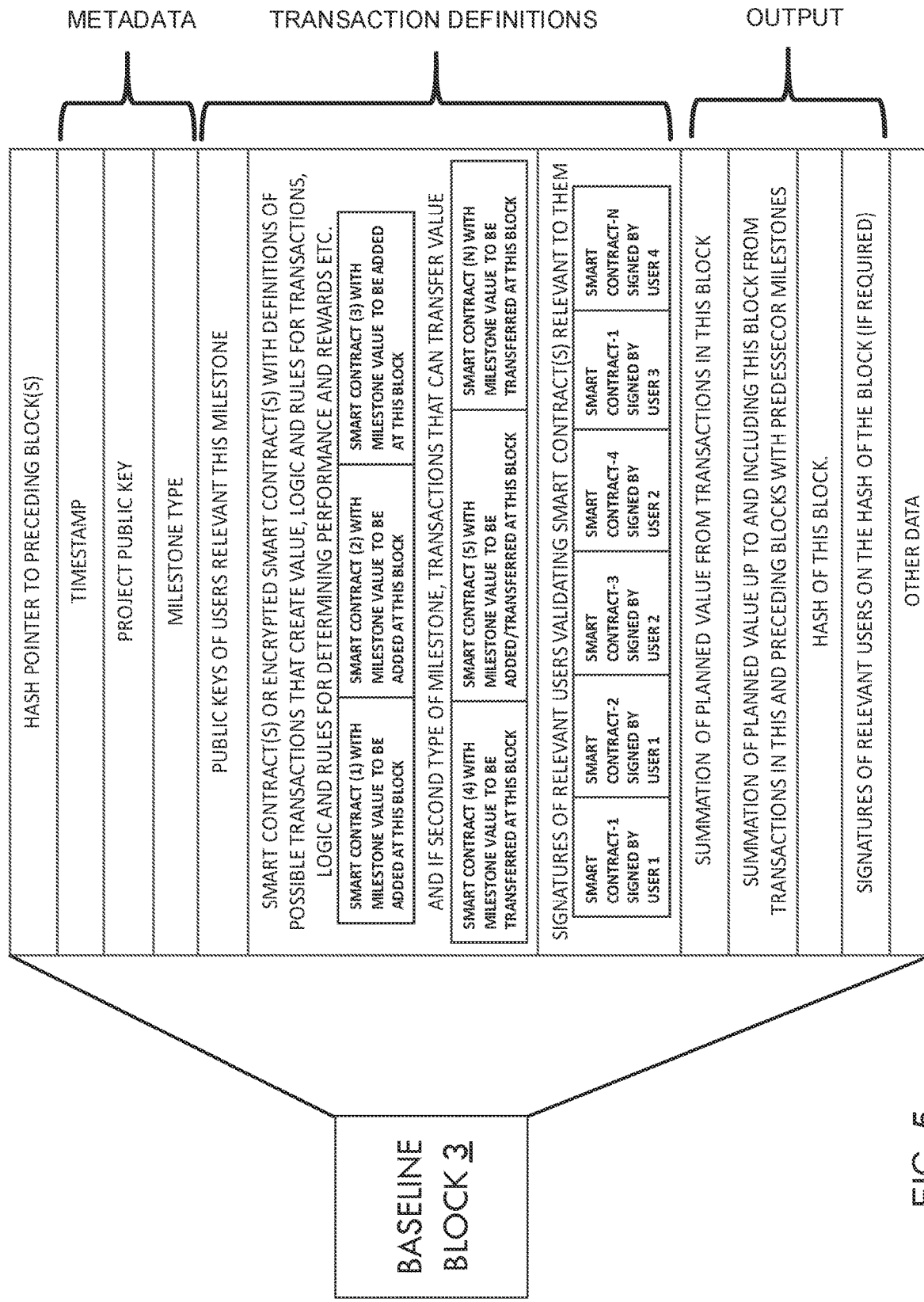
FIG. 5 illustrates an example of a baseline block representing a milestone, according to an implementation of the invention.

FIG. 5 represents a baseline block 3 that encodes milestones for a project 6. The baseline block 3 (other than an initial baseline block) may include a hash pointer to a preceding block on the baseline blockchain 2. In this manner, because the baseline blocks 3 are chained together, tampering of one block is difficult because all subsequent blocks would also be required to be altered, and on at least a majority of the nodes 10.

The baseline block 3 (whether or not the initial baseline block) may include metadata, transaction definitions, output data, and/or other information. The metadata may include a timestamp such as a time indicating when the baseline block 3 was created, the project's public key, a milestone type (whether the first type or the second type), and/or other information. The transaction definitions may include public keys of users relevant to the milestone (such as project value creators and owners), one or more smart contracts 1-N (which may be encrypted), signatures of relevant parties, and/or other transaction information. The smart contracts 1-3 may encode a milestone value to be added (in other words, expected value to be added) at this block and the smart contracts 4-N encode milestone value to be transferred at this block (if the milestone is a second type of milestone). The output data may include a summation of planned value from transactions in this block, a summation of expected value up to and including this block (which may include preceding blocks), a hash of the current block (which is used in a next block), signatures of relevant users on the hash of the block (if required), and/or other data. The metrics of actual versus planned performance may indicate a level of expected performance defined in the corresponding baseline block 3 as compared to actual level of performance indicated by the transaction(s) referenced by the realized block 5. In some instances, the baseline block 3 may also specify which proportion of the expected value created in its immediate predecessor baseline blocks 3 encoding milestones it will inherit, if its immediate baseline blocks(s) have more than one successor, for summation purposes)

Figure 3:
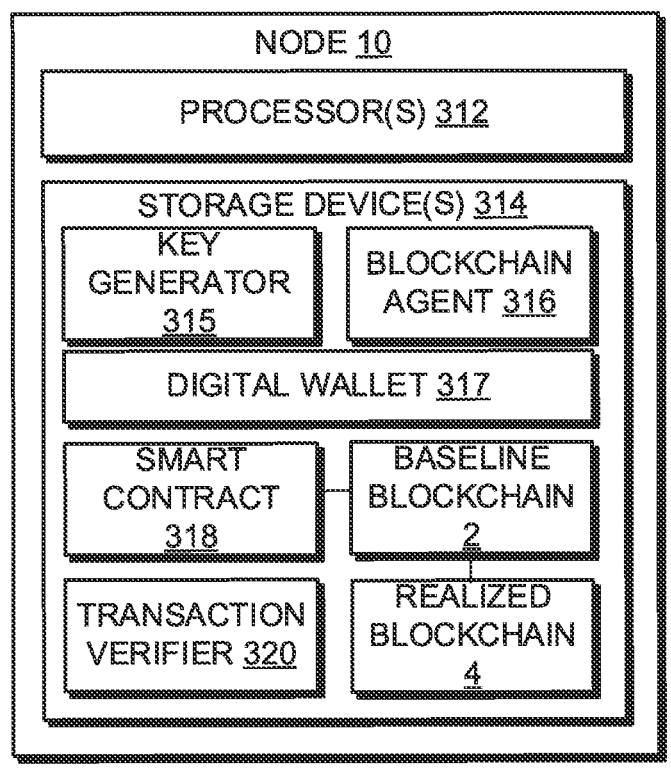
FIG. 3 illustrates an example of a node of a blockchain network in a system for executing time bound activity chains using a baseline blockchain and a realized blockchain, according to an implementation of the invention.

Reference will be made to FIG. 3, which illustrates an example of a node 10 of a blockchain network 1 in a system for executing time bound activity chains using a baseline blockchain and a realized blockchain, according to an implementation of the invention.

Each node 10 may include one or more processors 312, one or more storage devices 314, and/or other components. As such, a node 10 may include a computing device that participates in the blockchain network 1. The storage devices 314 may store one or more instructions that program the processors 312 to perform the functions described herein. The one or more instructions may include, without limitation, a key generator 315, a blockchain agent 316, a digital wallet 137, a local copy of the smart contract(s) 318 (instructions in the form of encoded rules for project value creation described herein), a local copy of the baseline blockchain 2, a local copy of the realized blockchain 4, a transaction verifier 320, and/or other instructions.

In some instances, a user's keys may be generated locally at a node 10 operated by that user. In these instances, the node 10 may include the key generator 315, which may generate the public and private keys. The public keys may be used to identify the user, to encrypt messages to the user, to verify the user's signatures, and together with the private keys may be used for public key cryptography. The User's private keys are known to, and controlled by, only the user or by their designated agent. The digital wallet 317 may manage the keys.

The blockchain agent 316 may interface with the baseline blockchain 2 and/or the realized blockchain 4. For example, the blockchain agent 316 may communicate with other nodes 10. Such communication may be through peer-to-peer protocols and/or other network protocols. The blockchain agent 316 may include a messaging interface, such as an HTTPS micro-server or other messaging interface. This interface may be used to broadcast transactions to the blockchain network 1 for verification by other nodes 10, as well as obtain transactions and other communications from the other nodes. The blockchain agent 316 may include or interface with a blockchain Application Programming Interface ("API") that is used to communicate with a blockchain platform (not illustrated).

Upon receipt of (including partial or full completion of) a milestone, a project owner, via its digital wallet, may generate a transaction for updating the realized blockchain to indicate that a milestone has been achieved. Alternatively or additionally, a project value creator(s) for that milestone may generate and transmit the transaction. The transaction may be transmitted to the smart contract contained in a baseline block 3 that encodes a corresponding milestone. The smart contract may use encoded rules and protocols to determine the validity of the transaction to indicate that a milestone has been achieved. Transactions sent by the project value creator will typically include the signatures of the project owner at place(s) defined by the smart contract. Also, a transaction can be sent by a Project which has its own keys that can be distinct from that of the owner. The sender of the transaction may digitally sign it regardless of the signatures that are in the payload of the transaction for the smart contract to interpret. The transaction may include a payload that identifies a work record, a project, a milestone (such as a hash representing a baseline block that encodes the relevant milestone), a timestamp, any signatures required by the smart contract such as those of the relevant value creators for that milestone, and/or other information. The work record may specify actions that have been undertaken toward progressing to the milestone. The digital wallet 317 of the transmitter (project owner or project value creator etc.) may sign the transaction with the transmitter's private key and transmit the transaction to the blockchain network for validation and incorporation into the realized blockchain.

The transaction verifier 320 may obtain and validate the submitted transaction. In some instances, the transaction verifier 320 may do so based on a consensus decision. For implementations where a consensus decision is used, the number, percentage, or other metric to determine whether a consensus has been achieved may be predefined or set according to particular needs. Furthermore, the consensus decision techniques may be based on consensus framework with methods or algorithms defined for that milestone, such as any of several protocols and algorithms that are available or could be developed, some examples are, Redundant Byzantine Fault Tolerance ("RBFT"), Apache Kafka, or Proof of Elapsed Time ("PoET"), and/or other consensus algorithm.

The validation may be based on whether the project owner, value creator, and/or others who submitted the transaction is permitted to submit transactions to update the realized blockchain. For example, the valid users for a milestone may be identified in the smart contract. The certificates may be a reference against the users that can be utilized by the smart contract, i.e. to identify them, for permissions, etc. Alternatively or additionally, the validation may be based on whether the corresponding milestone's performance metrics are consistent with the work record. For example, the work record may specify that a certain action was achieved, which may be validated based on determining whether such action is specified by the relevant milestone. Alternatively or additionally, the signatures of some or all parties identified for that milestone against the relevant work record might need to be verified to indicate their assent.

Transaction protocols may be encoded in the smart contracts and are automatically executed when the proper conditions arise, for instance based on the submission of a transaction that contains the hash of a document, signifying milestone achievement, that may be digitally signed by both the value creator and the project owner. This is implemented by the transaction verifier 320 running on each of the nodes 10, which are associated with project users identified as "validators" in the smart contract. With multiple endorsing peer nodes 10, the consensus algorithm in the smart contract may determine the validity of the transaction. For instance, an agreement in the validity of the transaction between the project owner and the value creator may be required. In this example, the only two validating peers named in the smart contracts may be the project owner and the value creator. However, the number of validating peers may include any number of peers, including for instance, stakeholders such as regulators, partners, government bodies, etc. with the weight of their validation and method of achieving consensus encoded in the consensus protocol that is part of the smart contract.

Figure 6:
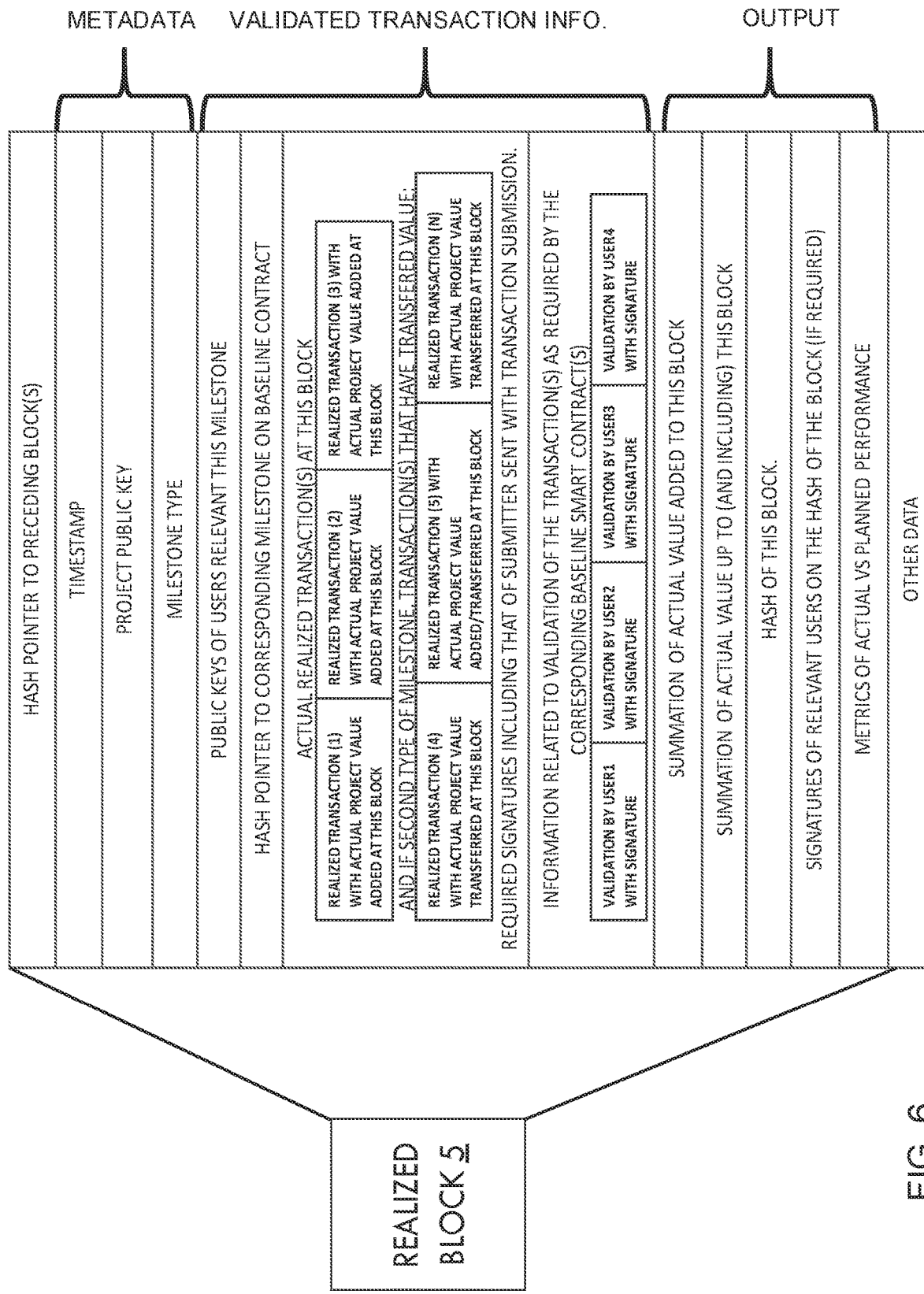
FIG. 6 illustrates an example of a realized block representing a milestone, according to an implementation of the invention.
Figure 9:
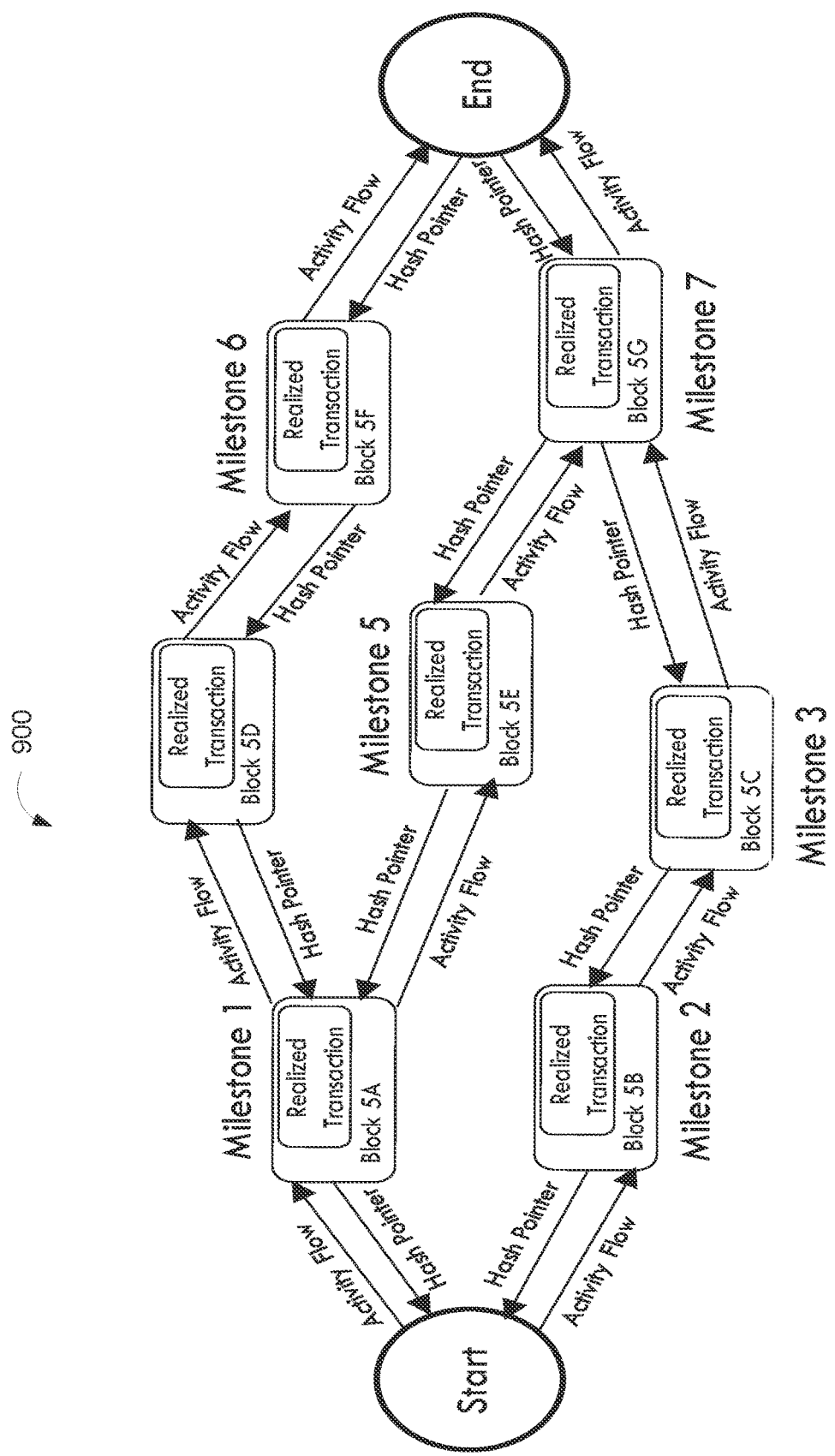
FIG. 9 illustrates an example of a realized blockchain that tracks activity relating to the milestones encoded on the baseline blockchain, according to an implementation of the invention.
Figure 10:
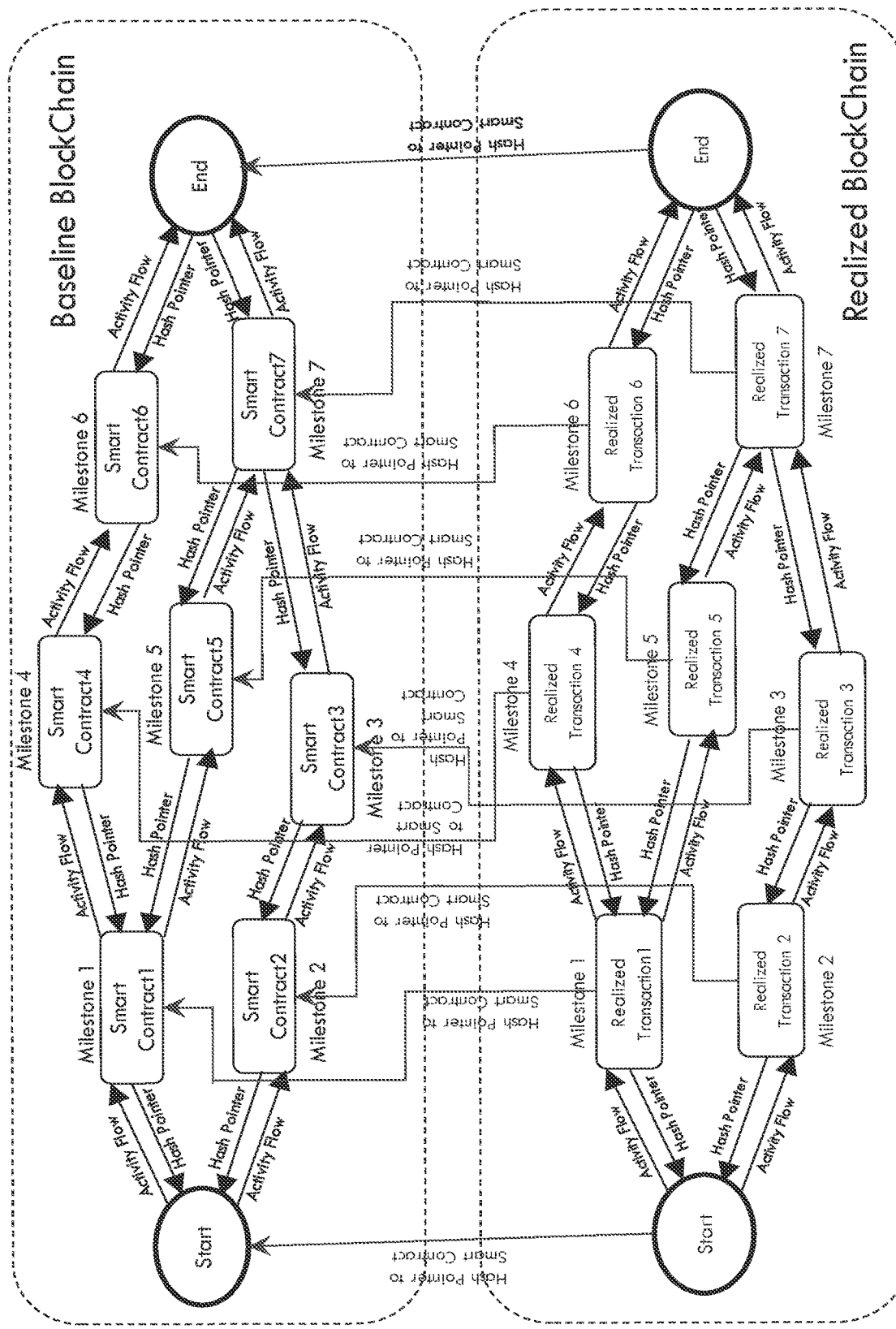
FIG. 10 illustrates an example of a baseline blockchain that encodes milestones with example of a corresponding realized blockchain that tracks activity relating to the milestones encoded on the baseline blockchain, according to an implementation of the invention.

In some implementations, the transactions may be written to the realized blockchain whose correctness has been approved by the pre-defined endorsement and consensus framework or policy associated with the project network Once the transaction is validated, the blockchain agent 316 may write the transaction as a realized block 5 in the realized blockchain 4. FIG. 6 illustrates an example of a realized block 5 representing a milestone, according to an implementation of the invention. The realized block 5 (other than an initial realized block) may include a hash pointer to a preceding block on the realized blockchain 4, as illustrated in FIGS. 9 and 10, for example. In this manner, because the realized blocks 5 are chained together, tampering of one block is difficult because all subsequent blocks would also be required to be altered, and on at least a majority of the nodes 10.

The realized block 5 may include metadata, validated transaction information, output data, and/or other information. The metadata may include a timestamp such as a time indicating when the realized block 5 was created, the project's public key, a milestone type (whether the first type or the second type), and/or other information. The validated transaction information may include public keys of users relevant to the milestone (such as project value creators and owners), a hash pointer to a corresponding baseline block 3, an actual project value added at this block (illustrated as realized transactions 1-3), if the milestone is a second type of milestone: transactions for which value has been transferred (illustrated as realized transactions 4-N), information related to transaction validation as required by corresponding smart contracts encoded by a corresponding baseline block 3, and/or other transaction information. The transaction validation may include the signature by each user required to sign a transaction (illustrated by Users 1-4). The output data may include a summation of actual added value up to this block (which may include preceding blocks), a summation of actual value up to and including this block, a hash of the current block (which is used in a next block), signatures of relevant users on the hash of the block (if required), metrics of actual versus planned performance, and/or other data. The metrics of actual versus planned performance may indicate a level of expected performance defined in the corresponding baseline block 3 as compared to actual level of performance indicated by the transaction(s) referenced by the realized block 5.

Figure 7:
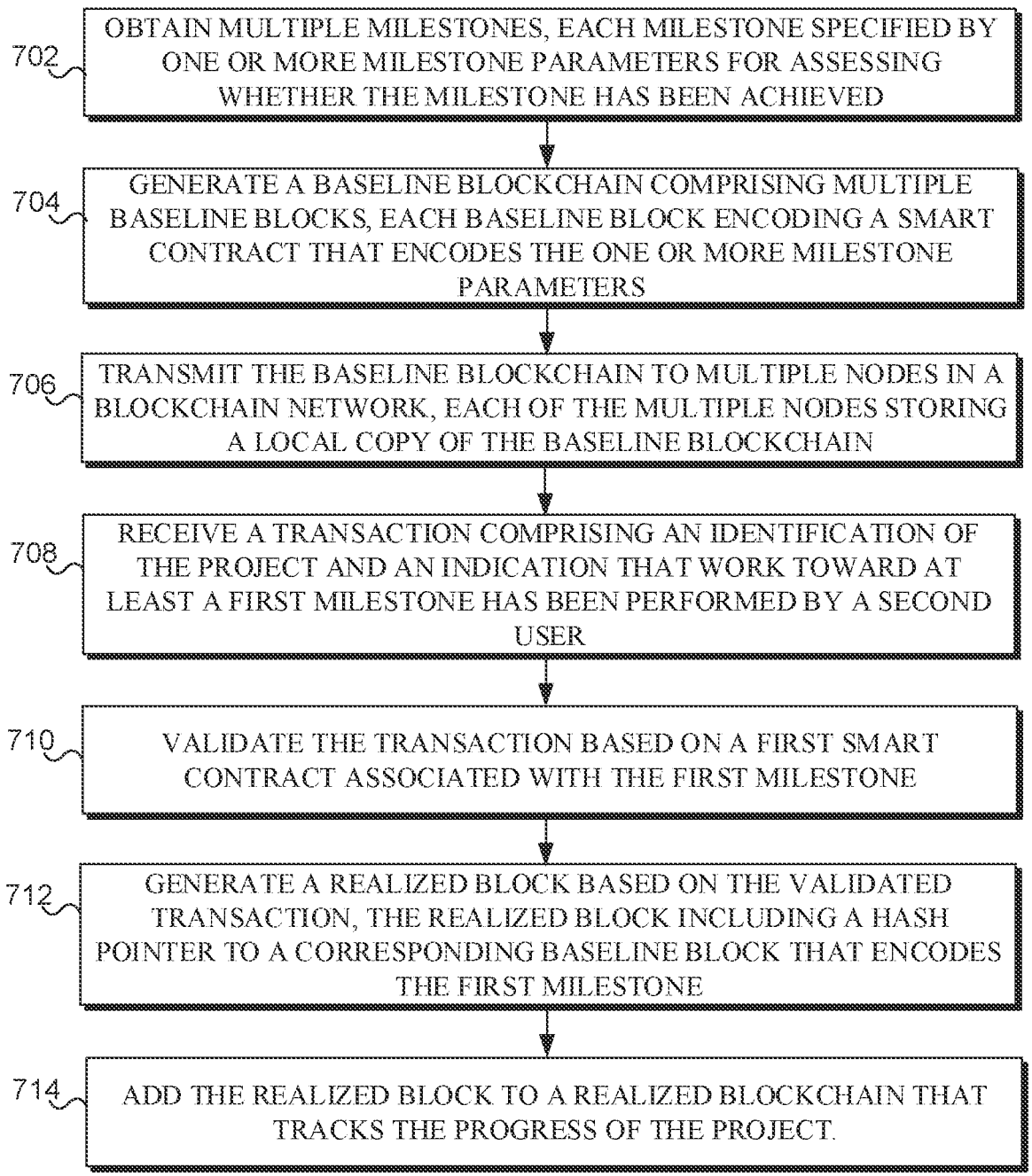
FIG. 7 illustrates an example of a process of executing time bound activity chains using a baseline blockchain that encodes milestones and a realized blockchain that tracks activity relating to the milestones encoded on the baseline blockchain, according to an implementation of the invention.

FIG. 7 illustrates an example of a process 700 of executing time bound activity chains using a baseline blockchain that encodes milestones and a realized blockchain that tracks activity relating to the milestones encoded on the baseline blockchain, according to an implementation of the invention.

In an operation 702, process 700 may include obtaining multiple milestones, each milestone specified by one or more milestone parameters for assessing whether the milestone has been achieved.

In an operation 704, process 700 may include generating a baseline blockchain comprising multiple baseline blocks, each baseline block referring back to a prior baseline block in the baseline blockchain, and each baseline block encoding a smart contract that encodes the one or more milestone parameters.

In an operation 706, process 700 may include transmitting the baseline blockchain to multiple nodes in a blockchain network, each of the multiple nodes storing a local copy of the baseline blockchain.

In an operation 708, process 700 may include receiving a transaction from a first user, the transaction comprising an identification of the project and an indication that work toward at least a first milestone has been performed by a second user. The transaction may be signed using the first user's private key. In some instances, the second user may submit the transaction. The payload of the transaction may contain the signatures of the users named as parties to that transaction against data significant to the completion of the milestone. The transaction as a whole may be signed by the user who submits it. In some cases, only the project owner (who may pay for and may finally own the project value) may be required to have its signature in the payload. The foregoing requirement of who must sign may be encoded by the smart contract definition and is specific to individual projects and are defined by the users.

In an operation 710, process 700 may include validating the transaction based on a first smart contract associated with the first milestone.

In an operation 712, process 700 may include generating a realized block based on the validated transaction, the realized block including a hash pointer to a corresponding baseline block that encodes the first milestone. The hash pointer may include a hash value of the corresponding baseline block.

In an operation 714, process 700 may include adding the realized block to a realized blockchain that tracks the progress of the project.

Each of the baseline and realized blockchains (2, 4) may be implemented in various ways. In each blockchain, a corresponding distributed ledger may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. Other blockchain platform technologies may be used as well, such as the Ethereum platform, described in the white paper, "Ethereum Specification" (https://github.com/ethereum/wiki/wiki/White-Paper), the contents of which are incorporated by reference in its entirety herein. It should be noted that the foregoing examples of distributed ledgers do not include various features disclosed herein that facilitate project management and are used as examples of distributed ledgers.

Blockchain introduced via Bitcoin is a shared ledger on a peer-to-peer network whose nodes each of which runs the blockchain software. Transactions are relayed peer-to-peer to all the nodes by each other. The double spending problem is overcome by making transaction approval by consensus. The transactions may be grouped into blocks and hashing them together with a nonce and the hash of the previous block until a hash value below a threshold value is found (as set by the network). The repeated hashing that is required to reach below the threshold value is the proof-of-work required on the Bitcoin network. The finding of the threshold requires considerable computing power. The threshold value is kept to where the difficulty of finding is remains difficult keeping track of increases in computing power. The non-reputability comes from having to redo the proof of work associated with each block succeeding the mutated one. The computational power required for this is offset by the reward in the form of Bitcoins which could be greater than what could accrue by using the same computing power to create false transactions.

Blockchain is built on Public Key Cryptography or Asymmetrical Cryptography. Such cryptographic systems use 2 related keys. Public keys are disseminated as needed while, and private keys are known only to the owner. Information encrypted with a public key can only be deciphered with a private key (vice versa cases are possible for some schemes but atypical). Public Key Cryptography forms a robust means of encrypting information, and also of verifying signatures on information. The need to verify binding of entities to their Public key is critical to trust with this. A method to build a Public Key Infrastructure from the platform represented by the system and augmentation of this with work records from projects whose execution is enabled by blockchain technology is described as part of the invention.

Figure 8:
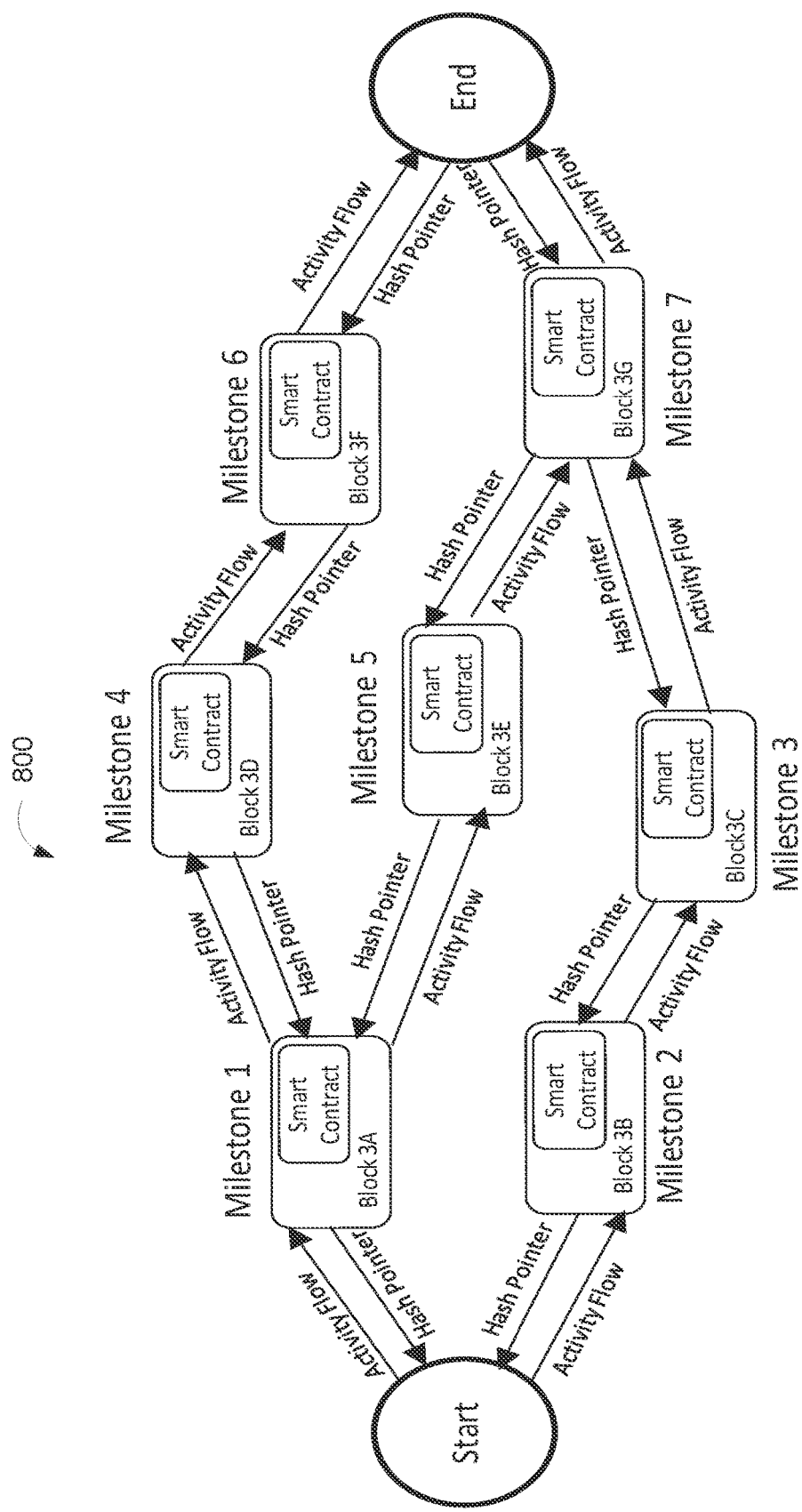
FIG. 8 illustrates an example of a baseline blockchain that encodes milestones, according to an implementation of the invention.

FIG. 8 illustrates an example 800 of a baseline blockchain 2 that encodes milestones (Milestones 1-7), according to an implementation of the invention. A project network may be modeled as a shared ledger distributed across project participants. As illustrated, a baseline block 3 may have a hash pointer to multiple other baseline blocks 3. For example, baseline block 3G may include a hash pointer to baseline blocks 3C and 3E. As also illustrated, a baseline block 3 may be pointed to by multiple other baseline blocks 3. For example, baseline block 3A may be pointed to by baseline blocks 3D and 3E. In this manner, a project network may be modeled using baseline blockchain 2, which represents a shared project schedule, in which activity may flow from one Milestone to the next. The foregoing facilitates immutability of committed dates without authorization by all affected parties. Each Milestone may be associated with a smart contract for automatic payments and/or other functions as described herein.

FIG. 9 illustrates an example of a realized blockchain 4 that tracks activity relating to the milestones encoded on the baseline blockchain, according to an implementation of the invention. A project network may be modeled as a shared ledger distributed across project participants. The realized blockchain 4 represents a shared record of project transactions and Milestone attainment. Transactions may be validated by submitting them to the smart contracts at the corresponding baseline block (milestone). Transactions may be validated using the rules and validation protocols embedded in the smart contract. Hash Pointers will point to Smart contracts at corresponding Baseline Milestones. as further illustrated in FIG. 10.

FIG. 10 illustrates an example of a baseline blockchain 2 that encodes milestones with example of a corresponding realized blockchain 4 that tracks activity relating to the milestones encoded on the baseline blockchain, according to an implementation of the invention. Hash pointers at realized transactions in the realized blockchain blocks (milestones) point to smart contracts at corresponding baseline blockchain blocks (milestones).

Although a one-to-one correspondence between one milestone on the baseline blockchain and one milestone on the realized blockchain is illustrated, there may be a one-to-many correspondence as well, according to particular needs.

FIG. 11 illustrates an example of archiving the baseline blockchain and realized blockchain to a project archive blockchain 1100 upon project completion, according to an implementation of the invention. As illustrated, a project archive blockchain 1100 may be composed of multiple blocks, each corresponding to an archive of a respective project. For example, Projects W, X, and Y are illustrated as being archived (where Project W is shown with little detail, Project X with more detail, and Project Y with most detail). The hash of an ending blockchain block of a baseline blockchain for Project X (illustrated as $H_B$) and the hash of an ending blockchain block of a realized blockchain for Project X (illustrated as HR) may be hashed for the top hash of the project X. The resultant top hash (a hash of the last realized block hash and the last baseline block hash) may be appended to the archive blockchain. Baseline and Realized blockchains may be similarly archived for Projects W, Y, and/or other projects. Therefore, every project completed on the system may be archived using the separate archive blockchain.

FIG. 12 illustrates an example of a first type of user Certificate, according to an implementation of the invention. A first type of Certificate in one embodiment of Work record storage is issued by the Certificate Authority ("CA") 50. This certificate authenticates the user and their work record by identifying attributes representative of that user's real-world identity and binding the user's identity and work record to their public key. These types of user certificates may contain the records of work pertaining to that user on one or more project(s) 6. These records may include several details regarding the user's participation in those projects and will contain the value created by the user in each of those projects. The value of the created work may be quantified in terms of the second type of token in some embodiments. Work records are shown stored as Merkle Tree leaves in this embodiment. However, any data structure may be used. In this manner, the user certificates may identify a user as well as track activity in the form of work value created by that user over one or more projects 6. A user certificate of the first type may be used to not only authenticate a user's identity, but also to authenticate their work record by storing work records of the user across one or more projects. In addition to reliably verifying the identity and work records of a user, the certificates issued by the CA 50 can be used by the user who is identified in the certificate to initiate new projects on the system. In some instances, the Certificate may have a unique identifier such as a serial number. Its contents pertaining to the user public key, identity and work records may be signed by the CA 50. This signature may be against a hash of this information. The signature is appended to the certificate. Upon completion of a new project 6 by the user, the records in the certificate may be updated, the required hashes may be recomputed, and the signature of CA 50 will be reapplied against the updated records.

FIG. 13 illustrates an example of a second type of user Certificate, according to an implementation of the invention. A second type of Certificate in one embodiment of Work record storage is issued by the Certificate Authority ("CA") 50. This certificate authenticates the user's work record by binding the user's work record to their public key. These types of user certificates may contain the records of work pertaining to that user on one or more project(s) 6. These records may include several details regarding the user's participation in those projects and will contain the value created by the user in each of those projects. The value of the created work may be quantified in terms of the second type of token in some embodiments. Work records are shown stored as Merkle Tree leaves in this embodiment. However, any data structure may be used. In this manner, the user certificates may track activity in the form of work value created by that user over one or more projects 6 and associate it with the public key of that user. A user certificate of the second type may be used to authenticate a user's work record by storing work records of the user across one or more projects. In addition to reliably verifying the work records of a user, the certificates issued by the CA 50 can be used by the user who is identified in the certificate to initiate new projects on the system. In some instances, the Certificate might have a unique identifier such as a serial number. Its contents pertaining to the user public key, and work records may be signed by the CA 50. This signature may be against a hash of this information. The signature is appended to the certificate. Upon completion of a new project 6 by the user, the records in the certificate may be updated, the required hashes may be recomputed, and the signature of CA 50 will be reapplied against the updated records.

FIG. 14 illustrates an example of a Project Certificate, according to an implementation of the invention. A Project 6 on the system may have its own public key that serves as its unique identifier. The CA 50 may issue the project a certificate that authenticates the project by identifying some real-world identity attribute(s) for that project 6 and binding them with the project's public key at project initiation. It subsequently authenticates the project work records by updating the certificate with records pertaining to work created for it, binding these records to the public key already bound to the project 6. The work records may contain the details of the users (identified by their public keys) who were responsible for that work. The value of the created work may be quantified in terms of the second type of token in some embodiments. The work records in the Project's Certificate are shown stored as Merkle Tree leaves in this embodiment. However, any data structure may be used. FIG. 14 illustrates a Project Certificate with one embodiment of Work record storage. In some embodiments of this Certificate, the project might sign the work records that were created for that project with the project public key, thus verifying their provenance. In some instances, the Certificate may have a unique identifier such as a serial number. Its contents pertaining to the project public key, project identity related information, and work records will be signed by the CA 50. This signature may be against a hash of this information. The signature is appended to the certificate. Upon completion of the project 6, the records in the certificate will be updated, the required signature(s) may be applied, the required hashes may be computed, and the signature of CA 50 will be applied against the final project records in that certificate.

Although illustrated in FIG. 1 as a single component, a computer system 110 may include a plurality of individual components (such as computer devices) each programmed with at least some of the functions described herein. The processor(s) 212, 312 may each include one or more physical processors that are programmed by computer program instructions. The various instructions described herein are provided for illustrative purposes. Other configurations and numbers of instructions may be used, so long as the processor(s) 212, 312 are programmed to perform the functions described herein.

Furthermore, it should be appreciated that although the various instructions are illustrated in FIG. 1 as being co-located within a single processing unit, in implementations in which processor(s) 212, 312 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 212, 312 may be programmed by one or more additional instructions that may perform some or all of the functionality attributed herein to one of the instructions.

The various instructions described herein may be stored in one or more storage devices 214, 314, which may comprise random access memory (RAM), read only memory (ROM), and/or other memory. The storage device may store the computer program instructions (such as the aforementioned instructions) to be executed by processors 212, 312 as well as data that may be manipulated by processors 212, 312. The storage device may comprise one or more non-transitory machine-readable storage media such as floppy disks, hard disks, optical disks, tapes, or other physical storage media for storing computer-executable instructions and/or data.

For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The components illustrated in FIG. 1 may be coupled to one another via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing figures, different numbers of entities than those depicted may be used. Furthermore, according to various implementations, the components described herein may be implemented in hardware and/or software that configure hardware.

The various processing operations and/or data flows depicted in FIG. 7 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Although the instant disclosure describes a blockchain-based verification framework, the framework can be implemented in any type of distributed ledger based systems. Blockchain is generally considered one example of distributed ledger. In this disclosure, blockchain and distributed ledger technology ("DLT") may be used interchangeably.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system of implementing multiple blockchains for project management, the system comprising:
   one or more physical processors; and
   a memory configured to store computer program instructions that, when executed by the one or more physical processors, cause the one or more physical processors to:
   obtain multiple milestones associated with the project, wherein each milestone includes one or more milestone parameters for assessing whether the milestone has been achieved;
   generate a first blockchain comprising multiple baseline blocks, wherein each of the multiple baseline blocks is associated with at least one of the multiple milestones, and wherein the multiple baseline blocks of the first blockchain have a first common data structure, wherein the first common data structure comprises:
   a header that includes a hash of a preceding baseline block in the first blockchain,
   a smart contract that encodes the one or more milestone parameters for assessing whether the corresponding milestone has been achieved; and
   digital signatures by one or more users indicating agreement by the one or more users to the smart contract that encodes the one or more milestone parameters for assessing whether the corresponding milestone has been achieved, wherein the first blockchain serves as immutable proof with provenance of the commitment by the one or more users to the multiple milestones associated with the project based on the digital signatures;
   generate a second blockchain that stores information indicating performance of actions related to the project, wherein the second blockchain includes one or more realized blocks having a second common data structure different than the first common data structure;
   transmit at least the first blockchain to multiple nodes in a blockchain network, each of the multiple nodes storing a local copy of at least the first blockchain;

receive a transaction from a first user comprising an identification of the project and an indication that work toward at least a first milestone of the multiple milestones has been performed by a second user;

validate the transaction based on a first smart contract of a first baseline block of the multiple baseline blocks, wherein the first baseline block is associated with the first milestone;

generate a realized block based on the validated transaction, the realized block including a hash of a preceding realized block of the second blockchain, a hash of a corresponding baseline block of the first blockchain associated with the first milestone, and an indication of a level of achievement of the first milestone; and add the realized block to the second blockchain.

2. The system of claim 1, wherein the transaction is received from the first user that is associated with a first user public key and a first user private key, wherein the transaction is cryptographically signed using the first user private key, and wherein the one or more physical processors are further caused to:

validate the transaction based further on the first user private key; and obtain the first user public key from the transaction to identify the first user's involvement in the first milestone.

3. The system of claim 2, wherein the first smart contract identifies one or more users that must sign the transaction for it to be valid, and wherein to validate the transaction, the one or more physical processors are further caused to:

obtain one or more signatures from a payload of the transaction; and determine that the one or more signatures correspond to the one or more users that must sign the transaction.

4. The system of claim 1, wherein the second user is associated with a second user public key and a second user private key, wherein the one or more physical processors are further caused to:

issue a second user certificate for the second user, the second user certificate authenticating the second user by indicating their identity and binding their identity to their public key to enable participation in the projects on the system by the second user if a certificate for the second user does not already exist; and store, in the second user certificate, one or more work records that indicate performance of at least the first milestone by the second user.

5. The system of claim 4, wherein the second user certificate is further configured to store an indication of participation by the second user in one or more projects other than the first project and one or more other work records that indicate performance of one or more milestones by the second user in the one or more other projects.

6. The system of claim 1, wherein each of multiple milestones is one of at least a first type of milestone or a second type of milestone, wherein the first type of milestone provides only a second type of token for users that perform milestones and the second type of milestone provides both a first type of token and/or the second type of token, wherein the first type of token is representative of a monetary value and the second type of token is representative of project value creation through achievement of milestones.

7. The system of claim 6, wherein at least the second user is associated with a digital wallet associated with units of value for the second user, and wherein the one or more physical processors are further caused to:

determine that the first milestone is of the first type of milestone based on the first smart contract;

identify a value of the second type of token to allocate to the second user based on the transaction; and increment a balance of the digital wallet that maintains the second type of token in the digital wallet based on the identified value of the second type of token from work value determined to be created at that milestone.

8. The system of claim 7, wherein the project is associated with a project digital wallet, and wherein the one or more physical processors are further caused to:

determine that the first milestone is of the first type of milestone based on the first smart contract;

identify a value of the second type of token to allocate to the second user based on the transaction; and endorse the transaction, if required by the first smart contract at the milestone.

9. The system of claim 6, wherein at least the second user is assigned with a digital wallet associated with units of value for the second user, and wherein the one or more physical processors are further caused to:

determine that the first milestone is of the second type of milestone based on the first smart contract;

identify a value of the second type of token to allocate to the second user based on the transaction;

increment a balance of the digital wallet that maintains the second type of token in the digital wallet based on the identified value of the second type of token from work value determined to be created at that milestone;

receive an indication from the second user to exchange at least a portion of the balance of the digital wallet that maintains the second type of token for a value of the first type of token, which is permitted by the second type of milestone;

identify a value of the first type of token based on the portion of the balance of the digital wallet that maintains the second type of token;

increment a second balance of the digital wallet that maintains the first type of token in the digital wallet based on the identified value of the first type of token; and decrement a corresponding balance of the second type of token in the digital wallet that maintains the second type of token based on the identified portion for exchange.

10. The system of claim 9, wherein the project is assigned with a project digital wallet, and wherein the one or more physical processors are further caused to:

increment a balance of the project digital wallet that maintains the second type of token in the project digital wallet based on the identified value of the second type of token; and decrement a balance of the project digital wallet that maintains the first type of token in the project digital wallet based on the identified value of the first type of token.

11. The system of claim 1, wherein the one or more physical processors are further caused to:

receive a final transaction indicating that work toward a final milestone of the multiple milestones has been completed;

determine, based on the first blockchain, that the final milestone has been reached; and archive in a storage the first blockchain and the second blockchain.

12. The system of claim 11, wherein to archive the first blockchain and the second blockchain, the one or more physical processors are further caused to:
obtain a last baseline block hash of the first blockchain;
obtain a last realized block hash of the second blockchain;
generate a project archive hash based on the last baseline block hash and the last realized block hash; and
add the project archive hash to an archive blockchain.

13. The system of claim 1, wherein the second common data structure comprises a header that includes a hash of a preceding realized block in the second blockchain, a hash of a corresponding baseline block of the first blockchain associated with a corresponding milestone, and an indication of a level of achievement of the corresponding milestone.

14. The system of claim 1, wherein the first blockchain comprises the multiple baseline blocks and an initial baseline block, and wherein the second blockchain comprises the one or more realized blocks and an initial realized block.

15. The system of claim 1, wherein the one or more physical processors are further caused to:
compare the multiple baseline blocks of the first blockchain with the one or more realized blocks of the second blockchain, wherein the multiple baseline blocks indicate a level of expected performance for the multiple milestones associated with the project, and wherein the one or more realized blocks indicate a level of actual performance for the multiple milestones associated with the project; and
track progress of the project based on the comparison.

16. A computer implemented method of implementing multiple blockchains for project management, the method being implemented in a computer system comprising one or more physical processors and a memory configured to store computer program instructions that, when executed by the one or more physical processors, cause the one or more physical processors to perform the method, the method comprising:
obtaining, by the one or more physical processors, multiple milestones associated with the project, wherein each milestone includes one or more milestone parameters for assessing whether the milestone has been achieved;
generating, by the one or more physical processors, a first blockchain comprising multiple baseline blocks, wherein each of the multiple baseline blocks is associated with at least one of the multiple milestones, and wherein the multiple baseline blocks of the first blockchain have a first common data structure, wherein the first common data structure comprises:
a header that includes a hash of a preceding baseline block in the first blockchain,
a smart contract that encodes the one or more milestone parameters for assessing whether the corresponding milestone has been achieved; and
digital signatures by one or more users indicating agreement by the one or more users to the smart contract that encodes the one or more milestone parameters for assessing whether the corresponding milestone has been achieved, wherein the first blockchain serves as immutable proof with provenance of the commitment by the one or more users to the multiple milestones associated with the project based on the digital signatures;
generating, by the one or more physical processors, a second blockchain that stores information indicating performance of actions related to the project, wherein the second blockchain includes one or more realized blocks having a second common data structure different than the first common data structure;
transmitting, by the one or more physical processors, at least the first blockchain to multiple nodes in a blockchain network, each of the multiple nodes storing a local copy of at least the first blockchain;
receiving, by the one or more physical processors, a transaction from a first user comprising an identification of the project and an indication that work toward at least a first milestone of the multiple milestones has been performed by a second user;
validating, by the one or more physical processors, the transaction based on a first smart contract of a first baseline block of the multiple baseline blocks, wherein the first baseline block is associated with the first milestone;
generating, by the one or more physical processors, a realized block based on the validated transaction, the realized block including a hash of a preceding realized block of the second blockchain, a hash of a corresponding baseline block of the first blockchain associated with the first milestone, and an indication of a level of achievement of the first milestone; and
adding, by the one or more physical processors, the realized block to the second blockchain.

17. The method of claim 16, wherein the transaction is received the first user that is associated with a first user public key and a first user private key, wherein the transaction is cryptographically signed using the first user private key, the method further comprising:
validating, by the one or more physical processors, the transaction based further on the first user private key; and
obtaining, by the one or more physical processors, the first user public key from the transaction to identify the first user's involvement in the first milestone.

18. The method of claim 17, wherein the first smart contract identifies one or more users that must sign the transaction for it to be valid, and wherein validating the transaction comprises:
obtaining, by the one or more physical processors, one or more signatures from a payload of the transaction; and
determining, by the one or more physical processors, that the one or more signatures correspond to the one or more users that must sign the transaction.

19. The method of claim 16, wherein the first user is associated with a second user public key and a second user private key, the method further comprising:
issuing, by the one or more physical processors, a second user certificate for the second user, the second user certificate authenticating the second user by indicating their identity and binding the identity to their public key to enable participation in the projects on the system by the second user if a certificate for the second user does not already exist; and
storing, by the one or more physical processors, in the second user certificate, one or more work records that indicate performance of at least the first milestone by the second user.

20. The method of claim 19, wherein the second user certificate is further configured to store an indication of participation by the second user in one or more projects other than the first project and one or more other work records that indicate performance of one or more milestones by the second user in the one or more other projects.

21. The method of claim 16, wherein each of multiple milestones is one of at least a first type of milestone or a second type of milestone, wherein the first type of milestone provides only a second type of token for users that perform milestones and the second type of milestone provides both a first type of token and the second type of token, wherein the first type of token is representative of a monetary value and the second type of token is representative of project value creation through achievement of milestones.

22. The method of claim 21, wherein at least the second user is associated with a digital wallet associated with units of value for the second user, the method further comprising:
   determining, by the one or more physical processors, that the first milestone is of the first type of milestone based on the first smart contract;
   identifying, by the one or more physical processors, a value of the second type of token to allocate to the second user based on the transaction; and
   incrementing, by the one or more physical processors, a balance of the digital wallet that maintains the second type of token in the digital wallet based on the identified value of the second type of token.

23. The method of claim 22, wherein the project is associated with a project digital wallet, the method further comprising:
   determining, by the one or more physical processors, that the first milestone is of the first type of milestone based on the first smart contract;
   identifying, by the one or more physical processors, a value of the second type of token to allocate to the second user based on the transaction; and
   endorsing the transaction, by the one or more physical processors, if required by the first smart contract at the milestone.

24. The method of claim 21, wherein at least the second user is assigned with a digital wallet associated with units of value for the second user, the method further comprising:
   determining, by the one or more physical processors, that the first milestone is of the second type of milestone based on the first smart contract;
   identifying, by the one or more physical processors, a value of the second type of token to allocate to the second user based on the transaction;
   incrementing, by the one or more physical processors, a balance of the digital wallet that maintains the second type of token in the digital wallet based on the identified value of the second type of token from work value determined to be created at that milestone;
   receiving, by the one or more physical processors, an indication from the second user to exchange at least a portion of the balance of the digital wallet that maintains the second type of token for a value of the first type of token, which is permitted by the second type of milestone;
   identifying, by the one or more physical processors, a value of the first type of token based on the portion of the balance of the digital wallet that maintains the second type of token;
   incrementing, by the one or more physical processors, a second balance of the digital wallet that maintains the first type of token in the digital wallet based on the identified value of the first type of token; and
   decrementing, by the one or more physical processors, a corresponding balance of the second type of token in the digital wallet that maintains the second type of token based on the identified portion for exchange.

25. The method of claim 24, wherein the project is assigned with a project digital wallet, the method further comprising:
   incrementing, by the one or more physical processors, a balance of the project digital wallet that maintains the second type of token in the project digital wallet based on the identified value of the second type of token; and
   decrementing, by the one or more physical processors, a balance of the project digital wallet that maintains the first type of token in the project digital wallet based on the identified value of the first type of token.

26. The method of claim 16, the method further comprising:
   receiving, by the one or more physical processors, a final transaction indicating that work toward a final milestone of the multiple milestones has been completed;
   determining, by the one or more physical processors, that the final milestone has been reached based on the first blockchain; and
   archiving, by the one or more physical processors, in a storage the first blockchain and the second blockchain.

27. The method of claim 26, wherein archiving the first blockchain and the second blockchain comprises:
   obtaining, by the one or more physical processors, a last baseline block hash of the first blockchain;
   obtaining, by the one or more physical processors, a last realized block hash of the second blockchain;
   generating, by the one or more physical processors, a project archive hash based on the last baseline block hash and the last realized block hash; and
   adding, by the one or more physical processors, the project archive hash to an archive blockchain.

28. The method of claim 16, wherein the second common data structure comprises a header that includes a hash of a preceding realized block in the second blockchain, a hash of a corresponding baseline block of the first blockchain associated with a corresponding milestone, and an indication of a level of achievement of the corresponding milestone.

29. The method of claim 16, wherein the first blockchain comprises the multiple baseline blocks and an initial baseline block, and wherein the second blockchain comprises the one or more realized blocks and an initial realized block.

30. The method of claim 16, the method further comprising:
   comparing, by the one or more physical processors, the multiple baseline blocks of the first blockchain with the one or more realized blocks of the second blockchain, wherein the multiple baseline blocks indicate a level of expected performance for the multiple milestones associated with the project, and wherein the one or more realized blocks indicate a level of actual performance for the multiple milestones associated with the project; and
   tracking, by the one or more physical processors, progress of the project based on the comparison.

* * * * *